US012485166B2

(12) United States Patent
Daum et al.

(10) Patent No.: US 12,485,166 B2
(45) **Date of Patent: *Dec. 2, 2025**

(54) VACCINES FOR THE TREATMENT AND PREVENTION OF ZOONOTIC INFECTIONS

(71) Applicant: Longhorn Vaccines and Diagnostics, LLC, Bethesda, MD (US)

(72) Inventors: Luke T. Daum, San Antonio, TX (US); Gerald W. Fischer, Bethesda, MD (US)

(73) Assignee: Longhorn Vaccines and Diagnostics, LLC, Bethesda, MD (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/682,377

(22) Filed: Feb. 28, 2022

(65) Prior Publication Data

US 2022/0280634 A1 Sep. 8, 2022
US 2024/0245763 A9 Jul. 25, 2024

Related U.S. Application Data

(63) Continuation-in-part of application No. 17/161,997, filed on Jan. 29, 2021, now Pat. No. 11,866,463.

(60) Provisional application No. 63/246,580, filed on Sep. 21, 2021, provisional application No. 63/156,645, filed on Mar. 4, 2021, provisional application No. 63/109,966, filed on Nov. 5, 2020, provisional application No. 62/971,654, filed on Feb. 7, 2020, provisional application No. 62/971,036, filed on Feb. 6, 2020.

(51) Int. Cl.

| | |
|---|---|
| ***A61K 39/145*** | (2006.01) |
| ***A61K 38/00*** | (2006.01) |
| ***A61K 39/00*** | (2006.01) |
| ***A61K 39/02*** | (2006.01) |
| ***A61K 47/54*** | (2017.01) |
| ***A61K 47/64*** | (2017.01) |
| ***A61K 47/69*** | (2017.01) |
| ***A61P 31/16*** | (2006.01) |
| ***C07K 14/11*** | (2006.01) |
| ***C07K 14/195*** | (2006.01) |
| ***C07K 16/10*** | (2006.01) |
| ***C07K 16/12*** | (2006.01) |

(52) U.S. Cl.

CPC ............ *A61K 39/145* (2013.01); *A61K 39/02* (2013.01); *A61K 47/543* (2017.08); *A61K 47/549* (2017.08); *A61K 47/6415* (2017.08); *A61K 47/646* (2017.08); *A61K 47/6911* (2017.08); *A61P 31/16* (2018.01); *C07K 14/11* (2013.01); *C07K 14/195* (2013.01); *C07K 16/1018* (2013.01); *C07K 16/1289* (2013.01); *A61K 38/00* (2013.01); *A61K 2039/6037* (2013.01); *C07K 2319/40* (2013.01); *C07K 2319/55* (2013.01); *C12N 2760/16134* (2013.01); *C12N 2770/20034* (2013.01)

(58) Field of Classification Search
None
See application file for complete search history.

(56) References Cited

U.S. PATENT DOCUMENTS

| | | | |
|---|---|---|---|
| 4,196,265 | A | 4/1980 | Koprowski |
| 4,235,244 | A | 11/1980 | Abele |
| 4,529,702 | A | 7/1985 | Bryan |
| 4,554,101 | A | 11/1985 | Hopp |
| 4,634,664 | A | 1/1987 | Oestberg |
| 4,634,666 | A | 1/1987 | Engleman |
| 4,668,476 | A | 5/1987 | Bridgham |
| 4,683,195 | A | 7/1987 | Mullis |
| 4,683,202 | A | 7/1987 | Mullis |
| 4,707,450 | A | 11/1987 | Nason |
| 4,744,982 | A | 5/1988 | Hunter |
| 4,746,490 | A | 5/1988 | Saneii |
| 4,749,490 | A | 6/1988 | Smyth |
| 4,800,159 | A | 1/1989 | Mullis |
| 4,803,998 | A | 2/1989 | Kezes |
| 4,816,513 | A | 3/1989 | Bridgham |
| 4,883,750 | A | 11/1989 | Whiteley |
| 4,954,449 | A | 9/1990 | Hunter |
| 4,996,143 | A | 2/1991 | Heller |
| 5,091,316 | A | 2/1992 | Monthony |
| 5,108,927 | A | 4/1992 | Dorn |
| 5,145,684 | A | 9/1992 | Liversidge |
| 5,149,653 | A | 9/1992 | Roser |
| 5,163,441 | A | 11/1992 | Monthony |
| 5,168,039 | A | 12/1992 | Crawford |
| 5,182,109 | A | 1/1993 | Tamura |
| 5,186,898 | A | 2/1993 | Bridgham |
| 5,234,809 | A | 8/1993 | Boom |
| 5,399,363 | A | 3/1995 | Liversidge |

(Continued)

OTHER PUBLICATIONS

International Preliminary Search Report for WIPO Application No. PCT/US2022/018125 dated Aug. 18, 2022.
International Preliminary Opinion for WIPO Application No. PCT/US2022/018125 dated Aug. 18, 2022.
Search Report for EP Application No. 22763831 dated Jan. 21, 2025.
Exam Report for EP Application No. 22763831 dated Jan. 21, 2025.
Search Report for Application No. ZA2023/09263 dated Feb. 19, 2025.
Exam Report for Application No. ZA2023/09263 dated Feb. 19, 2025.

(Continued)

*Primary Examiner* — Jana A Hines
*Assistant Examiner* — Khatol S Shahnan Shah
(74) *Attorney, Agent, or Firm* — Remenick PLLC

(57) ABSTRACT

The invention relates to compositions comprising a nucleic acid that encodes a peptide or a peptide that induces an immune response in an animal or a mammal that is protective against infection by one or more pathogens. In addition, the invention relates to vaccines comprising compositions and to method for treating and preventing an infection in animals and mammals such as humans.

19 Claims, No Drawings

Specification includes a Sequence Listing.

(56) References Cited

U.S. PATENT DOCUMENTS 5,422,241 A 6/1995 Goldrick
5,482,856 A 1/1996 Fell, Jr.
5,503,841 A 4/1996 Doyle
5,543,158 A 8/1996 Gref
5,545,555 A 8/1996 Racioppi
5,552,157 A 9/1996 Yagi
5,565,213 A 10/1996 Nakamori
5,565,322 A 10/1996 Heller
5,567,434 A 10/1996 Szoka, Jr.
5,571,511 A 11/1996 Fischer
5,627,071 A 5/1997 Triva
5,641,515 A 6/1997 Ramtoola
5,656,016 A 8/1997 Ogden
5,679,356 A 10/1997 Bonnem
5,691,299 A 11/1997 Fabry
5,697,899 A 12/1997 Hillman
5,702,944 A 12/1997 Racioppi
5,736,333 A 4/1998 Livak
5,738,868 A 4/1998 Shinkarenko
5,741,516 A 4/1998 Webb
5,770,219 A 6/1998 Chiang
5,779,708 A 7/1998 Wu
5,783,208 A 7/1998 Venkateshwaran
5,785,973 A 7/1998 Bixler
5,785,975 A 7/1998 Parikh
5,795,582 A 8/1998 Wright
5,795,587 A 8/1998 Gao
5,797,898 A 8/1998 Santini, Jr.
5,800,810 A 9/1998 Doyle
5,849,489 A 12/1998 Heller
5,891,624 A 4/1999 Huang
5,945,515 A 8/1999 Chomczynski
5,955,074 A 9/1999 Fischer
6,033,673 A 3/2000 Clements
6,060,068 A 5/2000 Doyle
6,136,585 A 10/2000 Ball
6,162,603 A 12/2000 Heller
6,204,375 B1 3/2001 Lader
6,306,404 B1 10/2001 LaPosta
6,312,395 B1 11/2001 Tripp
6,440,423 B1 8/2002 Clements
6,451,325 B1 9/2002 Van Nest
6,500,432 B1 12/2002 Dalemans
6,534,065 B1 3/2003 Makin
6,572,866 B1 6/2003 Torcia
6,602,510 B1 8/2003 Fikes
6,603,908 B2 8/2003 Dallas
6,603,998 B1 8/2003 King
6,610,293 B1 8/2003 Fischer
6,617,170 B2 9/2003 Augello
6,632,432 B1 10/2003 Fischer
6,689,363 B1 2/2004 Sette
6,713,068 B1 3/2004 Audonnet
6,759,241 B1 7/2004 Hone
6,776,959 B1 8/2004 Helftenbein
6,780,421 B1 8/2004 Haensler
6,793,928 B1 9/2004 van Scharrenburg
6,855,321 B1 2/2005 Rappuoli
6,939,543 B2 9/2005 Fischer
7,090,853 B2 8/2006 Kapp
7,122,640 B2 10/2006 Gjerde
7,223,409 B2 5/2007 Nagata
7,279,162 B1 10/2007 Fischer
7,311,671 B2 12/2007 Jung
7,351,413 B2 4/2008 Page
7,357,936 B1 4/2008 Garcon
7,361,352 B2 4/2008 Birkett
7,438,919 B2 10/2008 Dowling
7,541,194 B2 6/2009 Mink
7,547,512 B2 6/2009 Peiris
7,648,681 B2 1/2010 Meyer
7,767,804 B2 8/2010 Bair, Jr.
7,794,001 B2 9/2010 Blackwell
8,080,645 B2 12/2011 Fischer
8,084,443 B2 12/2011 Fischer
8,097,419 B2 1/2012 Fischer
8,293,467 B2 10/2012 Fischer
8,415,330 B2 4/2013 Fischer
8,652,782 B2 2/2014 Fischer
8,669,240 B2 3/2014 Fischer
8,821,885 B2 9/2014 Fischer
8,883,165 B2 11/2014 Kaminaka
9,080,204 B2 7/2015 Fischer
9,212,399 B2 12/2015 Fischer
9,365,904 B2 6/2016 Fischer
9,370,775 B2 6/2016 Harvey
9,416,416 B2 8/2016 Fischer
9,481,912 B2 11/2016 Fischer
9,522,962 B2 * 12/2016 Ossendorp ............. A61K 39/40
9,555,094 B2 1/2017 Kuroda et al.
9,598,462 B2 3/2017 Fischer
9,683,256 B2 6/2017 Fischer
9,814,766 B2 11/2017 Fischer
9,821,047 B2 11/2017 Fischer
9,976,136 B2 5/2018 Fischer
10,004,799 B2 6/2018 Fischer
10,370,437 B2 8/2019 Fischer
10,414,819 B2 9/2019 Fischer
10,596,250 B2 3/2020 Fischer
10,787,504 B2 9/2020 Fischer
10,870,878 B2 12/2020 Fischer
2002/0082395 A1 6/2002 Fischer
2004/0013673 A1 1/2004 Fischer
2004/0038269 A1 2/2004 Birnboim
2004/0101859 A1 5/2004 Moon
2004/0101869 A1 5/2004 Berg
2004/0126789 A1 7/2004 Park
2004/0214272 A1 10/2004 La Rosa
2004/0223976 A1 11/2004 Bianchi
2005/0007948 A1 1/2005 Heineman
2005/0090009 A1 4/2005 Cormier
2005/0112656 A1 5/2005 Iwaki
2005/0123928 A1 6/2005 Das
2005/0169941 A1 8/2005 Lees
2005/0227269 A1 10/2005 Lloyd
2006/0002939 A1 1/2006 Fischer
2006/0014185 A1 1/2006 Ollikka
2006/0034853 A1 * 2/2006 Yuen .................... C07K 14/005
435/456
2006/0105468 A1 5/2006 Winkler
2006/0110803 A1 * 5/2006 Ter Meulen ....... C07K 16/1002
435/5
2006/0121468 A1 6/2006 Allnutt
2006/0134648 A1 6/2006 Chou
2006/0286557 A1 12/2006 Basehore
2007/0072229 A1 3/2007 Bialozynski
2007/0102946 A1 5/2007 Blackwell
2007/0172835 A1 7/2007 McBride
2007/0202497 A1 8/2007 Renuart
2007/0202511 A1 8/2007 Chen
2007/0286871 A1 12/2007 Hickle
2007/0292447 A1 12/2007 Bercovier
2008/0032921 A1 2/2008 Alexander
2008/0050737 A1 2/2008 Arieli
2008/0069821 A1 3/2008 Yang
2008/0075708 A1 3/2008 Yu
2008/0107665 A1 5/2008 Suckow
2008/0107687 A1 5/2008 Poulet
2008/0118531 A1 5/2008 Hoffmann
2008/0139789 A1 6/2008 Fischer
2008/0145373 A1 6/2008 Arumugham
2008/0181914 A1 7/2008 Eichhorn
2008/0260763 A1 10/2008 Felgner
2009/0081202 A1 * 3/2009 Fischer ................ A61K 39/085
435/235.1
2009/0098527 A1 4/2009 Fischer
2009/0202553 A1 8/2009 Morrow
2009/0233309 A1 9/2009 Fischer et al.
2010/0151477 A1 6/2010 Cawthon
2010/0221822 A1 9/2010 Fischer
2010/0247546 A1 9/2010 Fischer
2010/0311739 A1 12/2010 Gunaratnan
2011/0281754 A1 11/2011 Fischer
2012/0088231 A1 4/2012 Fischer

(56) References Cited

U.S. PATENT DOCUMENTS

| | | | |
|---|---|---|---|
| 2012/0100529 | A1 | 4/2012 | Fischer |
| 2012/0107799 | A1 | 5/2012 | Daum |
| 2012/0115126 | A1 | 5/2012 | Fischer |
| 2015/0024038 | A1 | 1/2015 | Fischer |
| 2017/0073738 | A1 | 3/2017 | Fischer |
| 2017/0232091 | A1 | 8/2017 | Aguiar |
| 2020/0239931 | A1 | 7/2020 | Birnboim |
| 2021/0079450 | A1 | 3/2021 | Daum |
| 2021/0246174 | A1 | 8/2021 | Daum |

OTHER PUBLICATIONS

R. Sharmin et al., A highly conserved WDYPKCDRA epitope in the RNA directed RNA polymerase of human coronavirus can be used as epitope-based universal vaccine design; BMC Bioinformatics15:161, 2014.

Search and Exam Report for EP Application No. 22763831.9 dated Jun. 6, 2025.

Meshkat, Z., Audsley, M., Beyer, C., Gowans, E. J., & Haqshenas, G. (2009). Reverse genetic analysis of a putative, influenza virus M2 HXXXW-like motif in the p7 protein of hepatitis C virus. Journal of viral hepatitis, 16(3), 187-194. https://doi.org/10.1111/j.1365-2893.2008.01064.x.

Exam Report for ZA Application No. ZA2023/09263 dated Jun. 27, 2025.

* cited by examiner

SEQUENCE LISTING

```
<160> NUMBER OF SEQ ID NOS: 131

<210> SEQ ID NO 1
<211> LENGTH: 19
<212> TYPE: PRT
<213> ORGANISM: Influenza A virus

<400> SEQUENCE: 1

Asp Trp Ser Gly Tyr Ser Gly Ser Phe Val Gln His Pro Glu Leu Thr
1               5                   10                  15

Gly Leu Asp


<210> SEQ ID NO 2
<211> LENGTH: 7
<212> TYPE: PRT
<213> ORGANISM: Unknown
<220> FEATURE:
<223> OTHER INFORMATION: Description of Unknown:
      Influenza virus M2e epitope sequence

<400> SEQUENCE: 2

Glu Thr Pro Ile Arg Asn Glu
1               5


<210> SEQ ID NO 3
<211> LENGTH: 15
<212> TYPE: PRT
<213> ORGANISM: Unknown
<220> FEATURE:
<223> OTHER INFORMATION: Description of Unknown:
      Influenza virus sequence

<400> SEQUENCE: 3

Phe Val Ile Arg Glu Pro Phe Ile Ser Cys Ser His Leu Glu Cys
1               5                   10                  15


<210> SEQ ID NO 4
<211> LENGTH: 6
<212> TYPE: PRT
<213> ORGANISM: Unknown
<220> FEATURE:
<223> OTHER INFORMATION: Description of Unknown:
      Influenza virus HA epitope; Pep 1 sequence

<400> SEQUENCE: 4

Gly Asn Phe Ile Ala Pro
1               5


<210> SEQ ID NO 5
<211> LENGTH: 6
<212> TYPE: PRT
<213> ORGANISM: Unknown
<220> FEATURE:
<223> OTHER INFORMATION: Description of Unknown:
      Influenza virus HA epitope; Pep 2 sequence

<400> SEQUENCE: 5

Gly Asn Leu Ile Ala Pro
1               5
```

```
<210> SEQ ID NO 6
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Gly Asn Leu Phe Ile Ala Pro
1               5


<210> SEQ ID NO 7
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gly Asn Leu Ile Phe Ala Pro
1               5


<210> SEQ ID NO 8
<211> LENGTH: 8
<212> TYPE: PRT
<213> ORGANISM: Unknown
<220> FEATURE:
<223> OTHER INFORMATION: Description of Unknown:
      Influenza virus NA epitope sequence

<400> SEQUENCE: 8

His Tyr Glu Glu Cys Ser Cys Tyr
1               5


<210> SEQ ID NO 9
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Leu Leu Thr Glu Val Glu Thr Pro Ile Arg
1               5                   10


<210> SEQ ID NO 10
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Leu Leu Thr Glu Val Glu Thr Pro Ile Arg Asn
1               5                   10


<210> SEQ ID NO 11
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11
```

```
Leu Leu Thr Glu Val Glu Thr Pro Ile Arg Asn Glu
1               5                   10


<210> SEQ ID NO 12
<211> LENGTH: 18
<212> TYPE: PRT
<213> ORGANISM: Influenza A virus

<400> SEQUENCE: 12

Asp Trp Ser Gly Tyr Ser Gly Ser Phe Val Gln His Pro Glu Leu Thr
1               5                   10                  15

Gly Leu


<210> SEQ ID NO 13
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Glu Val Glu Thr Pro Ile Arg Asn Glu
1               5


<210> SEQ ID NO 14
<211> LENGTH: 38
<212> TYPE: PRT
<213> ORGANISM: Unknown
<220> FEATURE:
<223> OTHER INFORMATION: Description of Unknown:
      Influenza virus sequence

<400> SEQUENCE: 14

Phe Leu Leu Pro Glu Asp Glu Thr Pro Ile Arg Asn Glu Trp Gly Leu
1               5                   10                  15

Leu Thr Asp Asp Glu Thr Pro Ile Arg Tyr Ile Lys Ala Asn Ser Lys
            20                  25                  30

Phe Ile Gly Ile Thr Glu
        35


<210> SEQ ID NO 15
<211> LENGTH: 64
<212> TYPE: PRT
<213> ORGANISM: Unknown
<220> FEATURE:
<223> OTHER INFORMATION: Description of Unknown:
      Influenza virus sequence

<400> SEQUENCE: 15

Gly Asn Leu Phe Ile Ala Pro Gly Asn Leu Phe Ile Ala Pro His Tyr
1               5                   10                  15

Glu Glu Cys Ser Cys Tyr His Tyr Glu Glu Cys Ser Cys Tyr Gln Tyr
            20                  25                  30

Ile Lys Ala Asn Ser Lys Phe Ile Gly Ile Thr Glu His Tyr Glu Glu
        35                  40                  45

Cys Ser Cys Tyr Thr Pro Ile Arg Asn Glu Thr Pro Ile Arg Asn Glu
    50                  55                  60


<210> SEQ ID NO 16
<211> LENGTH: 35
<212> TYPE: PRT
<213> ORGANISM: Artificial Sequence
```

<220> FEATURE:
<223> OTHER INFORMATION: Description of Artificial Sequence: Synthetic
polypeptide

<400> SEQUENCE: 16

Gly Asn Leu Phe Ile Ala Pro Gly Asn Leu Phe Ile Ala Pro Gln Tyr
1 5 10 15

Ile Lys Ala Asn Ser Lys Phe Ile Gly Ile Thr Glu Gly Asn Leu Phe
20 25 30

Ile Ala Pro
35

<210> SEQ ID NO 17
<211> LENGTH: 48
<212> TYPE: PRT
<213> ORGANISM: Unknown
<220> FEATURE:
<223> OTHER INFORMATION: Description of Unknown:
Influenza virus sequence

<400> SEQUENCE: 17

His Tyr Glu Glu Cys Ser Cys Tyr Asp Trp Ser Gly Tyr Ser Gly Ser
1 5 10 15

Phe Val Gln His Pro Glu Leu Thr Gly Leu His Tyr Glu Glu Cys Ser
20 25 30

Cys Tyr Gln Tyr Ile Lys Ala Asn Ser Lys Phe Ile Gly Ile Thr Glu
35 40 45

<210> SEQ ID NO 18
<211> LENGTH: 33
<212> TYPE: PRT
<213> ORGANISM: Unknown
<220> FEATURE:
<223> OTHER INFORMATION: Description of Unknown:
Influenza virus sequence

<400> SEQUENCE: 18

Ile Thr Gly Phe Ala Pro Phe Ser Lys Asp Asn Ser Ile Arg Leu Ser
1 5 10 15

Ala Gly Gly Asp Ile Trp Val Thr Arg Glu Pro Tyr Val Ser Cys Asp
20 25 30

Pro

<210> SEQ ID NO 19
<211> LENGTH: 7
<212> TYPE: PRT
<213> ORGANISM: Unknown
<220> FEATURE:
<223> OTHER INFORMATION: Description of Unknown:
Influenza virus HA epitope sequence

<400> SEQUENCE: 19

Ile Trp Gly Ile His His Pro
1 5

<210> SEQ ID NO 20
<211> LENGTH: 7
<212> TYPE: PRT
<213> ORGANISM: Unknown
<220> FEATURE:
<223> OTHER INFORMATION: Description of Unknown:
Influenza virus HA epitope sequence

<400> SEQUENCE: 20

Ile Trp Gly Val His His Pro
1 5

<210> SEQ ID NO 21
<211> LENGTH: 8
<212> TYPE: PRT
<213> ORGANISM: Artificial Sequence
<220> FEATURE:
<223> OTHER INFORMATION: Description of Artificial Sequence: Synthetic peptide

<400> SEQUENCE: 21

Ile Trp Gly Val Ile His His Pro
1 5

<210> SEQ ID NO 22
<211> LENGTH: 8
<212> TYPE: PRT
<213> ORGANISM: Artificial Sequence
<220> FEATURE:
<223> OTHER INFORMATION: Description of Artificial Sequence: Synthetic peptide

<400> SEQUENCE: 22

Ile Trp Gly Ile Val His His Pro
1 5

<210> SEQ ID NO 23
<211> LENGTH: 16
<212> TYPE: PRT
<213> ORGANISM: Unknown
<220> FEATURE:
<223> OTHER INFORMATION: Description of Unknown: Influenza virus N3 conserved epitope sequence

<400> SEQUENCE: 23

Lys Ser Cys Ile Asn Arg Cys Phe Tyr Val Glu Leu Ile Arg Gly Arg
1 5 10 15

<210> SEQ ID NO 24
<211> LENGTH: 27
<212> TYPE: PRT
<213> ORGANISM: Unknown
<220> FEATURE:
<223> OTHER INFORMATION: Description of Unknown: Influenza virus M2e epitope sequence

<400> SEQUENCE: 24

Leu Leu Thr Glu Val Glu Thr Pro Ile Arg Asn Glu Ser Leu Leu Thr
1 5 10 15

Glu Val Glu Thr Pro Ile Arg Asn Glu Trp Gly
20 25

<210> SEQ ID NO 25
<211> LENGTH: 13
<212> TYPE: PRT
<213> ORGANISM: Unknown
<220> FEATURE:
<223> OTHER INFORMATION: Description of Unknown: Influenza virus M2e epitope sequence

<400> SEQUENCE: 25

Leu Leu Thr Glu Val Glu Thr Pro Ile Arg Asn Glu Trp
1 5 10

<210> SEQ ID NO 26
<211> LENGTH: 14

<212> TYPE: PRT
<213> ORGANISM: Unknown
<220> FEATURE:
<223> OTHER INFORMATION: Description of Unknown:
Influenza virus M2e epitope sequence

<400> SEQUENCE: 26

Leu Leu Thr Glu Val Glu Thr Pro Ile Arg Asn Glu Trp Gly
1 5 10

<210> SEQ ID NO 27
<211> LENGTH: 11
<212> TYPE: PRT
<213> ORGANISM: Unknown
<220> FEATURE:
<223> OTHER INFORMATION: Description of Unknown:
Influenza virus M2e epitope sequence

<400> SEQUENCE: 27

Leu Thr Glu Val Glu Thr Pro Ile Arg Asn Glu
1 5 10

<210> SEQ ID NO 28
<211> LENGTH: 12
<212> TYPE: PRT
<213> ORGANISM: Unknown
<220> FEATURE:
<223> OTHER INFORMATION: Description of Unknown:
Influenza virus M2e epitope sequence

<400> SEQUENCE: 28

Leu Thr Glu Val Glu Thr Pro Ile Arg Asn Glu Trp
1 5 10

<210> SEQ ID NO 29
<211> LENGTH: 13
<212> TYPE: PRT
<213> ORGANISM: Unknown
<220> FEATURE:
<223> OTHER INFORMATION: Description of Unknown:
Influenza virus M2e epitope sequence

<400> SEQUENCE: 29

Leu Thr Glu Val Glu Thr Pro Ile Arg Asn Glu Trp Gly
1 5 10

<210> SEQ ID NO 30
<211> LENGTH: 9
<212> TYPE: PRT
<213> ORGANISM: Unknown
<220> FEATURE:
<223> OTHER INFORMATION: Description of Unknown:
Influenza virus M2e epitope sequence

<400> SEQUENCE: 30

Met Ser Leu Leu Thr Glu Val Glu Thr
1 5

<210> SEQ ID NO 31
<211> LENGTH: 10
<212> TYPE: PRT
<213> ORGANISM: Unknown
<220> FEATURE:
<223> OTHER INFORMATION: Description of Unknown:
Influenza virus M2e epitope sequence

<400> SEQUENCE: 31

Met Ser Leu Leu Thr Glu Val Glu Thr Pro 1 5 10

<210> SEQ ID NO 32
<211> LENGTH: 11
<212> TYPE: PRT
<213> ORGANISM: Unknown
<220> FEATURE:
<223> OTHER INFORMATION: Description of Unknown:
Influenza virus M2e epitope sequence

<400> SEQUENCE: 32

Met Ser Leu Leu Thr Glu Val Glu Thr Pro Ile
1 5 10

<210> SEQ ID NO 33
<211> LENGTH: 12
<212> TYPE: PRT
<213> ORGANISM: Unknown
<220> FEATURE:
<223> OTHER INFORMATION: Description of Unknown:
Influenza virus M2e epitope sequence

<400> SEQUENCE: 33

Met Ser Leu Leu Thr Glu Val Glu Thr Pro Ile Arg
1 5 10

<210> SEQ ID NO 34
<211> LENGTH: 13
<212> TYPE: PRT
<213> ORGANISM: Unknown
<220> FEATURE:
<223> OTHER INFORMATION: Description of Unknown:
Influenza virus M2e epitope sequence

<400> SEQUENCE: 34

Met Ser Leu Leu Thr Glu Val Glu Thr Pro Ile Arg Asn
1 5 10

<210> SEQ ID NO 35
<211> LENGTH: 14
<212> TYPE: PRT
<213> ORGANISM: Unknown
<220> FEATURE:
<223> OTHER INFORMATION: Description of Unknown:
Influenza virus M2e epitope sequence

<400> SEQUENCE: 35

Met Ser Leu Leu Thr Glu Val Glu Thr Pro Ile Arg Asn Glu
1 5 10

<210> SEQ ID NO 36
<211> LENGTH: 20
<212> TYPE: PRT
<213> ORGANISM: Unknown
<220> FEATURE:
<223> OTHER INFORMATION: Description of Unknown:
Influenza virus M2e epitope sequence

<400> SEQUENCE: 36

Met Ser Leu Leu Thr Glu Val Glu Thr Pro Ile Arg Asn Glu Thr Pro
1 5 10 15

Ile Arg Asn Glu
20

<210> SEQ ID NO 37
<211> LENGTH: 15
<212> TYPE: PRT

<213> ORGANISM: Unknown
<220> FEATURE:
<223> OTHER INFORMATION: Description of Unknown:
Influenza virus M2e epitope sequence

<400> SEQUENCE: 37

Met Ser Leu Leu Thr Glu Val Glu Thr Pro Ile Arg Asn Glu Trp
1 5 10 15

<210> SEQ ID NO 38
<211> LENGTH: 16
<212> TYPE: PRT
<213> ORGANISM: Unknown
<220> FEATURE:
<223> OTHER INFORMATION: Description of Unknown:
Influenza virus M2e epitope sequence

<400> SEQUENCE: 38

Met Ser Leu Leu Thr Glu Val Glu Thr Pro Ile Arg Asn Glu Trp Gly
1 5 10 15

<210> SEQ ID NO 39
<211> LENGTH: 24
<212> TYPE: PRT
<213> ORGANISM: Unknown
<220> FEATURE:
<223> OTHER INFORMATION: Description of Unknown:
Influenza virus M2e epitope sequence

<400> SEQUENCE: 39

Met Ser Leu Leu Thr Glu Val Glu Thr Pro Ile Arg Asn Glu Trp Gly
1 5 10 15

Cys Arg Cys Asn Asp Ser Ser Asp
20

<210> SEQ ID NO 40
<211> LENGTH: 8
<212> TYPE: PRT
<213> ORGANISM: Unknown
<220> FEATURE:
<223> OTHER INFORMATION: Description of Unknown:
Influenza virus M2e epitope sequence

<400> SEQUENCE: 40

Ser Leu Leu Thr Glu Val Glu Thr
1 5

<210> SEQ ID NO 41
<211> LENGTH: 11
<212> TYPE: PRT
<213> ORGANISM: Unknown
<220> FEATURE:
<223> OTHER INFORMATION: Description of Unknown:
Influenza virus M2e epitope sequence

<400> SEQUENCE: 41

Ser Leu Leu Thr Glu Val Glu Thr Pro Ile Arg
1 5 10

<210> SEQ ID NO 42
<211> LENGTH: 13
<212> TYPE: PRT
<213> ORGANISM: Unknown
<220> FEATURE:
<223> OTHER INFORMATION: Description of Unknown:
Influenza virus M2e epitope sequence

<400> SEQUENCE: 42

Ser Leu Leu Thr Glu Val Glu Thr Pro Ile Arg Asn Glu
1 5 10

<210> SEQ ID NO 43
<211> LENGTH: 14
<212> TYPE: PRT
<213> ORGANISM: Unknown
<220> FEATURE:
<223> OTHER INFORMATION: Description of Unknown:
Influenza virus M2e epitope sequence

<400> SEQUENCE: 43

Ser Leu Leu Thr Glu Val Glu Thr Pro Ile Arg Asn Glu Trp
1 5 10

<210> SEQ ID NO 44
<211> LENGTH: 15
<212> TYPE: PRT
<213> ORGANISM: Unknown
<220> FEATURE:
<223> OTHER INFORMATION: Description of Unknown:
Influenza virus M2e epitope sequence

<400> SEQUENCE: 44

Ser Leu Leu Thr Glu Val Glu Thr Pro Ile Arg Asn Glu Trp Gly
1 5 10 15

<210> SEQ ID NO 45
<211> LENGTH: 21
<212> TYPE: PRT
<213> ORGANISM: Unknown
<220> FEATURE:
<223> OTHER INFORMATION: Description of Unknown:
Influenza virus M2e epitope sequence

<400> SEQUENCE: 45

Ser Leu Leu Thr Glu Val Glu Thr Pro Ile Arg Asn Glu Trp Gly Thr
1 5 10 15

Pro Ile Arg Asn Glu
20

<210> SEQ ID NO 46
<211> LENGTH: 27
<212> TYPE: PRT
<213> ORGANISM: Unknown
<220> FEATURE:
<223> OTHER INFORMATION: Description of Unknown:
Influenza virus M2e epitope sequence

<400> SEQUENCE: 46

Ser Leu Leu Thr Glu Val Glu Thr Pro Ile Arg Asn Glu Trp Gly Thr
1 5 10 15

Pro Ile Arg Asn Glu Thr Pro Ile Arg Asn Glu
20 25

<210> SEQ ID NO 47
<211> LENGTH: 33
<212> TYPE: PRT
<213> ORGANISM: Unknown
<220> FEATURE:
<223> OTHER INFORMATION: Description of Unknown:
Influenza virus M2e epitope sequence

<400> SEQUENCE: 47

Ser Leu Leu Thr Glu Val Glu Thr Pro Ile Arg Asn Glu Trp Gly Thr
1 5 10 15

Pro Ile Arg Asn Glu Thr Pro Ile Arg Asn Glu Thr Pro Ile Arg Asn
20 25 30

Glu

<210> SEQ ID NO 48
<211> LENGTH: 25
<212> TYPE: PRT
<213> ORGANISM: Artificial Sequence
<220> FEATURE:
<223> OTHER INFORMATION: Description of Artificial Sequence: Synthetic peptide

<400> SEQUENCE: 48

Ser Leu Leu Thr Glu Val Glu Thr Pro Ile Arg Asn Glu Trp Gly Leu
1 5 10 15

Leu Thr Glu Val Glu Thr Pro Ile Arg
20 25

<210> SEQ ID NO 49
<211> LENGTH: 10
<212> TYPE: PRT
<213> ORGANISM: Unknown
<220> FEATURE:
<223> OTHER INFORMATION: Description of Unknown: Influenza virus M2e epitope sequence

<400> SEQUENCE: 49

Thr Glu Val Glu Thr Pro Ile Arg Asn Glu
1 5 10

<210> SEQ ID NO 50
<211> LENGTH: 6
<212> TYPE: PRT
<213> ORGANISM: Unknown
<220> FEATURE:
<223> OTHER INFORMATION: Description of Unknown: Influenza virus M2e epitope sequence

<400> SEQUENCE: 50

Thr Pro Ile Arg Asn Glu
1 5

<210> SEQ ID NO 51
<211> LENGTH: 8
<212> TYPE: PRT
<213> ORGANISM: Unknown
<220> FEATURE:
<223> OTHER INFORMATION: Description of Unknown: Influenza virus M2e epitope sequence

<400> SEQUENCE: 51

Val Glu Thr Pro Ile Arg Asn Glu
1 5

<210> SEQ ID NO 52
<211> LENGTH: 52
<212> TYPE: PRT
<213> ORGANISM: Unknown
<220> FEATURE:
<223> OTHER INFORMATION: Description of Unknown: Influenza virus sequence

<400> SEQUENCE: 52

Val Thr Arg Glu Pro Tyr Val Ser Cys Asp Pro Lys Ser Cys Ile Asn
1 5 10 15

```
Arg Cys Phe Tyr Val Glu Leu Ile Arg Gly Arg Val Thr Arg Glu Pro
            20                  25                  30

Tyr Val Ser Cys Asp Pro Trp Tyr Ile Lys Ala Asn Ser Lys Phe Ile
        35                  40                  45

Gly Ile Thr Glu
    50


<210> SEQ ID NO 53
<211> LENGTH: 6
<212> TYPE: PRT
<213> ORGANISM: Unknown
<220> FEATURE:
<223> OTHER INFORMATION: Description of Unknown:
      Influenza virus HA conserved region; Pep 5 sequence

<400> SEQUENCE: 53

Trp Gly Ile His His Pro
1               5


<210> SEQ ID NO 54
<211> LENGTH: 6
<212> TYPE: PRT
<213> ORGANISM: Unknown
<220> FEATURE:
<223> OTHER INFORMATION: Description of Unknown:
      Influenza virus HA conserved region; Pep 4 sequence

<400> SEQUENCE: 54

Trp Gly Val His His Pro
1               5


<210> SEQ ID NO 55
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 55

Trp Gly Val Ile His His Pro
1               5


<210> SEQ ID NO 56
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Trp Gly Ile Val His His Pro
1               5


<210> SEQ ID NO 57
<211> LENGTH: 8
<212> TYPE: PRT
<213> ORGANISM: Unknown
<220> FEATURE:
<223> OTHER INFORMATION: Description of Unknown:
      Influenza virus HA conserved region sequence

<400> SEQUENCE: 57

Tyr Ile Trp Gly Ile His His Pro
1               5
```

<210> SEQ ID NO 58
<211> LENGTH: 8
<212> TYPE: PRT
<213> ORGANISM: Unknown
<220> FEATURE:
<223> OTHER INFORMATION: Description of Unknown:
Influenza virus HA conserved region sequence

<400> SEQUENCE: 58

Tyr Ile Trp Gly Val His His Pro
1 5

<210> SEQ ID NO 59
<211> LENGTH: 9
<212> TYPE: PRT
<213> ORGANISM: Artificial Sequence
<220> FEATURE:
<223> OTHER INFORMATION: Description of Artificial Sequence: Synthetic
peptide

<400> SEQUENCE: 59

Tyr Ile Trp Gly Val Ile His His Pro
1 5

<210> SEQ ID NO 60
<211> LENGTH: 9
<212> TYPE: PRT
<213> ORGANISM: Artificial Sequence
<220> FEATURE:
<223> OTHER INFORMATION: Description of Artificial Sequence: Synthetic
peptide

<400> SEQUENCE: 60

Tyr Ile Trp Gly Ile Val His His Pro
1 5

<210> SEQ ID NO 61
<211> LENGTH: 14
<212> TYPE: PRT
<213> ORGANISM: Unknown
<220> FEATURE:
<223> OTHER INFORMATION: Description of Unknown:
Influenza virus T cell epitope sequence

<400> SEQUENCE: 61

Gln Tyr Ile Lys Ala Asn Ser Lys Phe Ile Gly Ile Thr Glu
1 5 10

<210> SEQ ID NO 62
<211> LENGTH: 15
<212> TYPE: PRT
<213> ORGANISM: Unknown
<220> FEATURE:
<223> OTHER INFORMATION: Description of Unknown:
Influenza virus M2e epitope sequence

<400> SEQUENCE: 62

Pro Ile Arg Asn Glu Trp Gly Cys Arg Cys Asn Asp Ser Ser Asp
1 5 10 15

<210> SEQ ID NO 63
<211> LENGTH: 22
<212> TYPE: PRT
<213> ORGANISM: Artificial Sequence
<220> FEATURE:
<223> OTHER INFORMATION: Description of Artificial Sequence: Synthetic
peptide

```
<400> SEQUENCE: 63

Gly Asn Leu Phe Ile Ala Pro Trp Gly Val Ile His His Pro His Tyr
1               5                   10                  15

Glu Glu Cys Ser Cys Tyr
            20


<210> SEQ ID NO 64
<211> LENGTH: 10
<212> TYPE: PRT
<213> ORGANISM: Unknown
<220> FEATURE:
<223> OTHER INFORMATION: Description of Unknown:
      Influenza virus sequence

<400> SEQUENCE: 64

Cys Ala Gly Ala Gly Asn Phe Ile Ala Pro
1               5                   10


<210> SEQ ID NO 65
<211> LENGTH: 10
<212> TYPE: PRT
<213> ORGANISM: Unknown
<220> FEATURE:
<223> OTHER INFORMATION: Description of Unknown:
      Influenza virus sequence

<400> SEQUENCE: 65

Cys Ala Gly Ala Gly Asn Leu Ile Ala Pro
1               5                   10


<210> SEQ ID NO 66
<211> LENGTH: 11
<212> TYPE: PRT
<213> ORGANISM: Unknown
<220> FEATURE:
<223> OTHER INFORMATION: Description of Unknown:
      Influenza virus sequence

<400> SEQUENCE: 66

Cys Ala Gly Ala Gly Asn Leu Phe Ile Ala Pro
1               5                   10


<210> SEQ ID NO 67
<211> LENGTH: 10
<212> TYPE: PRT
<213> ORGANISM: Unknown
<220> FEATURE:
<223> OTHER INFORMATION: Description of Unknown:
      Influenza virus sequence

<400> SEQUENCE: 67

Cys Ala Gly Ala Trp Gly Val His His Pro
1               5                   10


<210> SEQ ID NO 68
<211> LENGTH: 10
<212> TYPE: PRT
<213> ORGANISM: Unknown
<220> FEATURE:
<223> OTHER INFORMATION: Description of Unknown:
      Influenza virus sequence

<400> SEQUENCE: 68

Cys Ala Gly Ala Trp Gly Ile His His Pro
1               5                   10
```

<210> SEQ ID NO 69
<211> LENGTH: 11
<212> TYPE: PRT
<213> ORGANISM: Unknown
<220> FEATURE:
<223> OTHER INFORMATION: Description of Unknown:
Influenza virus sequence

<400> SEQUENCE: 69

Cys Ala Gly Ala Trp Gly Val Ile His His Pro
1 5 10

<210> SEQ ID NO 70
<211> LENGTH: 11
<212> TYPE: PRT
<213> ORGANISM: Unknown
<220> FEATURE:
<223> OTHER INFORMATION: Description of Unknown:
Influenza virus sequence

<400> SEQUENCE: 70

Cys Ala Gly Ala Trp Gly Ile Val His His Pro
1 5 10

<210> SEQ ID NO 71
<211> LENGTH: 13
<212> TYPE: PRT
<213> ORGANISM: Unknown
<220> FEATURE:
<223> OTHER INFORMATION: Description of Unknown:
Influenza virus sequence

<400> SEQUENCE: 71

Gly Asn Leu Ile Ala Pro Trp Gly Val Ile His His Pro
1 5 10

<210> SEQ ID NO 72
<211> LENGTH: 17
<212> TYPE: PRT
<213> ORGANISM: Unknown
<220> FEATURE:
<223> OTHER INFORMATION: Description of Unknown:
Influenza virus sequence

<400> SEQUENCE: 72

Cys Ala Gly Ala Gly Asn Leu Ile Ala Pro Trp Gly Val Ile His His
1 5 10 15

Pro

<210> SEQ ID NO 73
<211> LENGTH: 14
<212> TYPE: PRT
<213> ORGANISM: Unknown
<220> FEATURE:
<223> OTHER INFORMATION: Description of Unknown:
Influenza virus sequence

<400> SEQUENCE: 73

Gly Asn Leu Phe Ile Ala Pro Trp Gly Val Ile His His Pro
1 5 10

<210> SEQ ID NO 74
<211> LENGTH: 18
<212> TYPE: PRT
<213> ORGANISM: Unknown
<220> FEATURE:
<223> OTHER INFORMATION: Description of Unknown:
Influenza virus sequence

<400> SEQUENCE: 74

Cys Ala Gly Ala Gly Asn Leu Phe Ile Ala Pro Trp Gly Val Ile His
1 5 10 15

His Pro

<210> SEQ ID NO 75
<211> LENGTH: 8
<212> TYPE: PRT
<213> ORGANISM: Unknown
<220> FEATURE:
<223> OTHER INFORMATION: Description of Unknown:
Influenza virus sequence

<400> SEQUENCE: 75

His Tyr Glu Glu Cys Ser Cys Tyr
1 5

<210> SEQ ID NO 76
<211> LENGTH: 12
<212> TYPE: PRT
<213> ORGANISM: Unknown
<220> FEATURE:
<223> OTHER INFORMATION: Description of Unknown:
Influenza virus sequence

<400> SEQUENCE: 76

Cys Ala Gly Ala His Tyr Glu Glu Cys Ser Cys Tyr
1 5 10

<210> SEQ ID NO 77
<211> LENGTH: 26
<212> TYPE: PRT
<213> ORGANISM: Unknown
<220> FEATURE:
<223> OTHER INFORMATION: Description of Unknown:
Influenza virus sequence

<400> SEQUENCE: 77

Cys Ala Gly Ala Gly Asn Leu Phe Ile Ala Pro Trp Gly Val Ile His
1 5 10 15

His Pro His Tyr Glu Glu Cys Ser Cys Tyr
20 25

<210> SEQ ID NO 78
<211> LENGTH: 28
<212> TYPE: PRT
<213> ORGANISM: Unknown
<220> FEATURE:
<223> OTHER INFORMATION: Description of Unknown:
Influenza virus sequence

<400> SEQUENCE: 78

Gly Asn Leu Phe Ile Ala Pro Trp Gly Val Ile His His Pro Gly Asn
1 5 10 15

Leu Phe Ile Ala Pro Trp Gly Val Ile His His Pro
20 25

<210> SEQ ID NO 79
<211> LENGTH: 32
<212> TYPE: PRT
<213> ORGANISM: Unknown
<220> FEATURE:
<223> OTHER INFORMATION: Description of Unknown:
Influenza virus sequence

<400> SEQUENCE: 79

Cys Ala Gly Ala Gly Asn Leu Phe Ile Ala Pro Trp Gly Val Ile His
1               5                   10                  15

His Pro Gly Asn Leu Phe Ile Ala Pro Trp Gly Val Ile His His Pro
            20                  25                  30

<210> SEQ ID NO 80
<211> LENGTH: 22
<212> TYPE: PRT
<213> ORGANISM: Unknown
<220> FEATURE:
<223> OTHER INFORMATION: Description of Unknown:
      Influenza virus sequence

<400> SEQUENCE: 80

His Tyr Glu Glu Cys Ser Cys Tyr Gly Asn Leu Phe Ile Ala Pro Trp
1               5                   10                  15

Gly Val Ile His His Pro
            20

<210> SEQ ID NO 81
<211> LENGTH: 22
<212> TYPE: PRT
<213> ORGANISM: Unknown
<220> FEATURE:
<223> OTHER INFORMATION: Description of Unknown:
      Influenza virus sequence

<400> SEQUENCE: 81

Gly Asn Leu Phe Ile Ala Pro His Tyr Glu Glu Cys Ser Cys Tyr Trp
1               5                   10                  15

Gly Val Ile His His Pro
            20

<210> SEQ ID NO 82
<211> LENGTH: 39
<212> TYPE: PRT
<213> ORGANISM: Unknown
<220> FEATURE:
<223> OTHER INFORMATION: Description of Unknown:
      Influenza virus sequence

<400> SEQUENCE: 82

Ser Leu Leu Thr Glu Val Glu Thr Pro Ile Arg Asn Glu Trp Gly Leu
1               5                   10                  15

Leu Thr Glu Val Glu Thr Pro Ile Arg Gln Tyr Ile Lys Ala Asn Ser
            20                  25                  30

Lys Phe Ile Gly Ile Thr Glu
        35

<210> SEQ ID NO 83
<211> LENGTH: 35
<212> TYPE: PRT
<213> ORGANISM: Unknown
<220> FEATURE:
<223> OTHER INFORMATION: Description of Unknown:
      Influenza virus sequence

<400> SEQUENCE: 83

Gly Asn Leu Phe Ile Ala Pro Gly Asn Leu Phe Ile Ala Pro Gln Tyr
1               5                   10                  15

Ile Lys Ala Asn Ser Lys Phe Ile Gly Ile Thr Glu Gly Asn Leu Phe
            20                  25                  30

Ile Ala Pro
35

<210> SEQ ID NO 84
<211> LENGTH: 48
<212> TYPE: PRT
<213> ORGANISM: Unknown
<220> FEATURE:
<223> OTHER INFORMATION: Description of Unknown:
Influenza virus sequence

<400> SEQUENCE: 84

His Tyr Glu Glu Cys Ser Cys Tyr Asp Trp Ser Gly Tyr Ser Gly Ser
1 5 10 15

Phe Val Gln His Pro Glu Leu Thr Gly Leu His Tyr Glu Glu Cys Ser
20 25 30

Cys Tyr Gln Tyr Ile Lys Ala Asn Ser Lys Phe Ile Gly Ile Thr Glu
35 40 45

<210> SEQ ID NO 85
<211> LENGTH: 52
<212> TYPE: PRT
<213> ORGANISM: Unknown
<220> FEATURE:
<223> OTHER INFORMATION: Description of Unknown:
Influenza virus sequence

<400> SEQUENCE: 85

Val Thr Arg Glu Pro Tyr Val Ser Cys Asp Pro Lys Ser Cys Ile Asn
1 5 10 15

Arg Cys Phe Tyr Val Glu Leu Ile Arg Gly Arg Val Thr Arg Glu Pro
20 25 30

Tyr Val Ser Cys Asp Pro Gln Tyr Ile Lys Ala Asn Ser Lys Phe Ile
35 40 45

Gly Ile Thr Glu
50

<210> SEQ ID NO 86
<211> LENGTH: 18
<212> TYPE: PRT
<213> ORGANISM: Unknown
<220> FEATURE:
<223> OTHER INFORMATION: Description of Unknown:
Influenza virus sequence

<400> SEQUENCE: 86

Asp Trp Ser Gly Tyr Ser Gly Ser Phe Val Gln His Pro Glu Leu Thr
1 5 10 15

Gly Leu

<210> SEQ ID NO 87
<211> LENGTH: 33
<212> TYPE: PRT
<213> ORGANISM: Unknown
<220> FEATURE:
<223> OTHER INFORMATION: Description of Unknown:
Influenza virus sequence

<400> SEQUENCE: 87

Ile Thr Gly Phe Ala Pro Phe Ser Lys Asp Asn Ser Ile Arg Leu Ser
1 5 10 15

Ala Gly Gly Asp Ile Trp Val Thr Arg Glu Pro Tyr Val Ser Cys Asp
20 25 30

Pro

<210> SEQ ID NO 88
<211> LENGTH: 16
<212> TYPE: PRT
<213> ORGANISM: Unknown
<220> FEATURE:
<223> OTHER INFORMATION: Description of Unknown:
Influenza virus sequence

<400> SEQUENCE: 88

Lys Ser Cys Ile Asn Arg Cys Phe Tyr Val Glu Leu Ile Arg Gly Arg
1 5 10 15

<210> SEQ ID NO 89
<211> LENGTH: 12
<212> TYPE: PRT
<213> ORGANISM: Unknown
<220> FEATURE:
<223> OTHER INFORMATION: Description of Unknown:
Influenza virus sequence

<400> SEQUENCE: 89

Gly Asn Leu Phe Ile Ala Pro Arg Tyr Ala Phe Ala
1 5 10

<210> SEQ ID NO 90
<211> LENGTH: 16
<212> TYPE: PRT
<213> ORGANISM: Unknown
<220> FEATURE:
<223> OTHER INFORMATION: Description of Unknown:
Influenza virus sequence

<400> SEQUENCE: 90

Cys Ala Gly Ala Gly Asn Leu Phe Ile Ala Pro Arg Tyr Ala Phe Ala
1 5 10 15

<210> SEQ ID NO 91
<211> LENGTH: 11
<212> TYPE: PRT
<213> ORGANISM: Unknown
<220> FEATURE:
<223> OTHER INFORMATION: Description of Unknown:
Influenza virus sequence

<400> SEQUENCE: 91

Gly Asn Leu Val Val Pro Arg Tyr Ala Phe Ala
1 5 10

<210> SEQ ID NO 92
<211> LENGTH: 15
<212> TYPE: PRT
<213> ORGANISM: Unknown
<220> FEATURE:
<223> OTHER INFORMATION: Description of Unknown:
Influenza virus sequence

<400> SEQUENCE: 92

Cys Ala Gly Ala Gly Asn Leu Val Val Pro Arg Tyr Ala Phe Ala
1 5 10 15

<210> SEQ ID NO 93
<211> LENGTH: 11
<212> TYPE: PRT
<213> ORGANISM: Unknown
<220> FEATURE:
<223> OTHER INFORMATION: Description of Unknown:

Influenza virus sequence

<400> SEQUENCE: 93

Gly Asn Leu Ile Ala Pro Arg Tyr Ala Phe Ala
1 5 10

<210> SEQ ID NO 94
<211> LENGTH: 15
<212> TYPE: PRT
<213> ORGANISM: Unknown
<220> FEATURE:
<223> OTHER INFORMATION: Description of Unknown:
Influenza virus sequence

<400> SEQUENCE: 94

Cys Ala Gly Ala Gly Asn Leu Ile Ala Pro Arg Tyr Ala Phe Ala
1 5 10 15

<210> SEQ ID NO 95
<211> LENGTH: 6
<212> TYPE: PRT
<213> ORGANISM: Unknown
<220> FEATURE:
<223> OTHER INFORMATION: Description of Unknown:
Influenza virus sequence

<400> SEQUENCE: 95

Gly Asn Leu Val Val Pro
1 5

<210> SEQ ID NO 96
<211> LENGTH: 10
<212> TYPE: PRT
<213> ORGANISM: Unknown
<220> FEATURE:
<223> OTHER INFORMATION: Description of Unknown:
Influenza virus sequence

<400> SEQUENCE: 96

Cys Ala Gly Ala Gly Asn Leu Val Val Pro
1 5 10

<210> SEQ ID NO 97
<211> LENGTH: 15
<212> TYPE: PRT
<213> ORGANISM: Unknown
<220> FEATURE:
<223> OTHER INFORMATION: Description of Unknown:
Influenza virus sequence

<400> SEQUENCE: 97

Phe Val Ile Arg Glu Pro Phe Ile Ser Cys Ser His Leu Glu Cys
1 5 10 15

<210> SEQ ID NO 98
<211> LENGTH: 19
<212> TYPE: PRT
<213> ORGANISM: Unknown
<220> FEATURE:
<223> OTHER INFORMATION: Description of Unknown:
Influenza virus sequence

<400> SEQUENCE: 98

Cys Ala Gly Ala Phe Val Ile Arg Glu Pro Phe Ile Ser Cys Ser His
1 5 10 15

Leu Glu Cys

```
<210> SEQ ID NO 99
<211> LENGTH: 22
<212> TYPE: PRT
<213> ORGANISM: Unknown
<220> FEATURE:
<223> OTHER INFORMATION: Description of Unknown:
      Influenza virus sequence

<400> SEQUENCE: 99

Gly Asn Leu Phe Ile Ala Pro Trp Gly Val Ile His His Pro His Tyr
1               5                   10                  15

Glu Glu Cys Ser Cys Tyr
            20


<210> SEQ ID NO 100
<211> LENGTH: 36
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 100

Gly Asn Leu Phe Ile Ala Pro Trp Gly Val Ile His His Pro His Tyr
1               5                   10                  15

Glu Glu Cys Ser Cys Tyr Gln Tyr Ile Lys Ala Asn Ser Lys Phe Ile
            20                  25                  30

Gly Ile Thr Glu
        35


<210> SEQ ID NO 101
<211> LENGTH: 36
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 101

Gln Tyr Ile Lys Ala Asn Ser Lys Phe Ile Gly Ile Thr Glu Gly Asn
1               5                   10                  15

Leu Phe Ile Ala Pro Trp Gly Val Ile His His Pro His Tyr Glu Glu
            20                  25                  30

Cys Ser Cys Tyr
        35


<210> SEQ ID NO 102
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 102

His Val Glu Glu Cys Ser Tyr
1               5


<210> SEQ ID NO 103
<211> LENGTH: 6
<212> TYPE: PRT
<213> ORGANISM: Unknown
<220> FEATURE:
<223> OTHER INFORMATION: Description of Unknown:
      Influenza virus H5 sequence
```

<400> SEQUENCE: 103

Trp Phe Ile His His Pro
1 5

<210> SEQ ID NO 104
<211> LENGTH: 11
<212> TYPE: PRT
<213> ORGANISM: Unknown
<220> FEATURE:
<223> OTHER INFORMATION: Description of Unknown:
Influenza virus stem peptide sequence

<400> SEQUENCE: 104

Asp Leu Trp Ser Tyr Asn Ala Glu Leu Leu Val
1 5 10

<210> SEQ ID NO 105
<211> LENGTH: 11
<212> TYPE: PRT
<213> ORGANISM: Unknown
<220> FEATURE:
<223> OTHER INFORMATION: Description of Unknown:
Influenza virus stem peptide sequence

<400> SEQUENCE: 105

Asp Ile Trp Thr Tyr Asn Ala Glu Leu Leu Val
1 5 10

<210> SEQ ID NO 106
<211> LENGTH: 5
<212> TYPE: PRT
<213> ORGANISM: Artificial Sequence
<220> FEATURE:
<223> OTHER INFORMATION: Description of Artificial Sequence: Synthetic
peptide
<220> FEATURE:
<221> NAME/KEY: MOD_RES
<222> LOCATION: (2)..(4)
<223> OTHER INFORMATION: Any amino acid

<400> SEQUENCE: 106

His Xaa Xaa Xaa Trp
1 5

<210> SEQ ID NO 107
<211> LENGTH: 7
<212> TYPE: PRT
<213> ORGANISM: Unknown
<220> FEATURE:
<223> OTHER INFORMATION: Description of Unknown:
Coronavirus RNA Polymerase region sequence

<400> SEQUENCE: 107

Tyr Pro Lys Cys Asp Arg Ala
1 5

<210> SEQ ID NO 108
<211> LENGTH: 9
<212> TYPE: PRT
<213> ORGANISM: Unknown
<220> FEATURE:
<223> OTHER INFORMATION: Description of Unknown:
Coronavirus RNA Polymerase region sequence

<400> SEQUENCE: 108

Trp Asp Tyr Pro Lys Cys Asp Arg Ala
1 5

<210> SEQ ID NO 109
<211> LENGTH: 23
<212> TYPE: PRT
<213> ORGANISM: Unknown
<220> FEATURE:
<223> OTHER INFORMATION: Description of Unknown:
Coronavirus spike protein sequence

<400> SEQUENCE: 109

Ser Leu Asp Gln Ile Asn Val Thr Phe Leu Asp Leu Glu Tyr Glu Met
1 5 10 15

Lys Lys Leu Glu Glu Ser Tyr
20

<210> SEQ ID NO 110
<211> LENGTH: 23
<212> TYPE: PRT
<213> ORGANISM: Unknown
<220> FEATURE:
<223> OTHER INFORMATION: Description of Unknown:
Coronavirus spike protein conserved epitope sequence

<400> SEQUENCE: 110

Ser Leu Asp Gln Ile Asn Val Thr Phe Leu Asp Leu Glu Tyr Glu Met
1 5 10 15

Lys Lys Leu Glu Glu Ser Tyr
20

<210> SEQ ID NO 111
<211> LENGTH: 37
<212> TYPE: PRT
<213> ORGANISM: Artificial Sequence
<220> FEATURE:
<223> OTHER INFORMATION: Description of Artificial Sequence: Synthetic
polypeptide

<400> SEQUENCE: 111

Ser Leu Asp Gln Ile Asn Val Thr Phe Leu Asp Leu Glu Tyr Glu Met
1 5 10 15

Lys Lys Leu Glu Glu Ser Tyr Gln Tyr Ile Lys Ala Asn Ser Lys Phe
20 25 30

Ile Gly Ile Thr Glu
35

<210> SEQ ID NO 112
<211> LENGTH: 9
<212> TYPE: PRT
<213> ORGANISM: Unknown
<220> FEATURE:
<223> OTHER INFORMATION: Description of Unknown:
Coronavirus polymerase conserved epitope sequence

<400> SEQUENCE: 112

Trp Asp Tyr Pro Lys Cys Asp Arg Ala
1 5

<210> SEQ ID NO 113
<211> LENGTH: 23
<212> TYPE: PRT
<213> ORGANISM: Artificial Sequence
<220> FEATURE:
<223> OTHER INFORMATION: Description of Artificial Sequence: Synthetic
peptide

<400> SEQUENCE: 113

Trp Asp Tyr Pro Lys Cys Asp Arg Ala Gln Tyr Ile Lys Ala Asn Ser
1 5 10 15

Lys Phe Ile Gly Ile Thr Glu
20

<210> SEQ ID NO 114
<211> LENGTH: 46
<212> TYPE: PRT
<213> ORGANISM: Artificial Sequence
<220> FEATURE:
<223> OTHER INFORMATION: Description of Artificial Sequence: Synthetic
polypeptide

<400> SEQUENCE: 114

Trp Asp Tyr Pro Lys Cys Asp Arg Ala Ser Leu Asp Gln Ile Asn Val
1 5 10 15

Thr Phe Leu Asp Leu Glu Tyr Glu Met Lys Lys Leu Glu Glu Ser Tyr
20 25 30

Gln Tyr Ile Lys Ala Asn Ser Lys Phe Ile Gly Ile Thr Glu
35 40 45

<210> SEQ ID NO 115
<211> LENGTH: 41
<212> TYPE: PRT
<213> ORGANISM: Artificial Sequence
<220> FEATURE:
<223> OTHER INFORMATION: Description of Artificial Sequence: Synthetic
polypeptide

<400> SEQUENCE: 115

Trp Asp Tyr Pro Lys Cys Asp Arg Ala Thr Glu Val Glu Thr Pro Ile
1 5 10 15

Arg Asn Glu His Tyr Glu Glu Cys Ser Cys Tyr Gln Tyr Ile Lys Ala
20 25 30

Asn Ser Lys Phe Ile Gly Ile Thr Glu
35 40

<210> SEQ ID NO 116
<211> LENGTH: 37
<212> TYPE: PRT
<213> ORGANISM: Artificial Sequence
<220> FEATURE:
<223> OTHER INFORMATION: Description of Artificial Sequence: Synthetic
polypeptide

<400> SEQUENCE: 116

Ser Leu Asp Gln Ile Asn Val Thr Phe Leu Asp Leu Glu Tyr Glu Met
1 5 10 15

Lys Lys Leu Glu Glu Ser Tyr Gln Tyr Ile Lys Ala Asn Ser Lys Phe
20 25 30

Ile Gly Ile Thr Glu
35

<210> SEQ ID NO 117
<211> LENGTH: 9
<212> TYPE: PRT
<213> ORGANISM: Unknown
<220> FEATURE:
<223> OTHER INFORMATION: Description of Unknown:
Coronavirus conserved sequence

<400> SEQUENCE: 117

Trp Asp Tyr Pro Lys Cys Asp Arg Ala 1 5

<210> SEQ ID NO 118
<211> LENGTH: 7
<212> TYPE: PRT
<213> ORGANISM: Unknown
<220> FEATURE:
<223> OTHER INFORMATION: Description of Unknown:
Coronavirus conserved sequence

<400> SEQUENCE: 118

Tyr Pro Lys Cys Asp Arg Ala
1 5

<210> SEQ ID NO 119
<211> LENGTH: 8
<212> TYPE: PRT
<213> ORGANISM: Betacoronavirus sp.

<400> SEQUENCE: 119

Ala Arg Asp Leu Ile Cys Ala Gln
1 5

<210> SEQ ID NO 120
<211> LENGTH: 14
<212> TYPE: PRT
<213> ORGANISM: Unknown
<220> FEATURE:
<223> OTHER INFORMATION: Description of Unknown:
Coronavirus highly conserved sequence

<400> SEQUENCE: 120

Lys Trp Pro Trp Tyr Ile Trp Leu Gly Phe Ile Ala Gly Leu
1 5 10

<210> SEQ ID NO 121
<211> LENGTH: 8
<212> TYPE: PRT
<213> ORGANISM: Unknown
<220> FEATURE:
<223> OTHER INFORMATION: Description of Unknown:
Coronavirus highly conserved sequence

<400> SEQUENCE: 121

Glu Asn Gln Lys Leu Ile Ala Asn
1 5

<210> SEQ ID NO 122
<211> LENGTH: 30
<212> TYPE: PRT
<213> ORGANISM: Artificial Sequence
<220> FEATURE:
<223> OTHER INFORMATION: Description of Artificial Sequence: Synthetic
polypeptide

<400> SEQUENCE: 122

Ala Arg Asp Leu Ile Cys Ala Gln Lys Trp Pro Trp Tyr Ile Trp Leu
1 5 10 15

Gly Phe Ile Ala Gly Leu Glu Asn Gln Lys Leu Ile Ala Asn
20 25 30

<210> SEQ ID NO 123
<211> LENGTH: 16
<212> TYPE: PRT
<213> ORGANISM: Artificial Sequence
<220> FEATURE:
<223> OTHER INFORMATION: Description of Artificial Sequence: Synthetic peptide

<400> SEQUENCE: 123

```
Glu Asn Gln Lys Leu Ile Ala Asn Ala Arg Asp Leu Ile Cys Ala Gln
1               5                   10                  15
```

<210> SEQ ID NO 124
<211> LENGTH: 25
<212> TYPE: PRT
<213> ORGANISM: Artificial Sequence
<220> FEATURE:
<223> OTHER INFORMATION: Description of Artificial Sequence: Synthetic peptide

<400> SEQUENCE: 124

```
Trp Asp Tyr Pro Lys Cys Asp Arg Ala Glu Asn Gln Lys Leu Ile Ala
1               5                   10                  15

Asn Ala Arg Asp Leu Ile Cys Ala Gln
            20                  25
```

<210> SEQ ID NO 125
<211> LENGTH: 31
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 125

```
Trp Asp Tyr Pro Lys Cys Asp Arg Ala Glu Asn Gln Lys Leu Ile Ala
1               5                   10                  15

Asn Lys Trp Pro Trp Tyr Ile Trp Leu Gly Phe Ile Ala Gly Leu
            20                  25                  30
```

<210> SEQ ID NO 126
<211> LENGTH: 39
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 126

```
Ala Arg Asp Leu Ile Cys Ala Gln Glu Asn Gln Lys Leu Ile Ala Asn
1               5                   10                  15

Trp Asp Tyr Pro Lys Cys Asp Arg Ala Gln Tyr Ile Lys Ala Asn Ser
            20                  25                  30

Lys Phe Ile Gly Ile Thr Glu
        35
```

<210> SEQ ID NO 127
<211> LENGTH: 76
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 127

```
Lys Trp Pro Trp Tyr Ile Trp Leu Gly Phe Ile Ala Gly Leu Trp Asp
1               5                   10                  15

Tyr Pro Lys Cys Asp Arg Ala Gln Tyr Ile Lys Ala Asn Ser Lys Phe
            20                  25                  30

Ile Gly Ile Thr Glu Ala Arg Asp Leu Ile Cys Ala Gln Glu Asn Gln
```

```
        35                  40                  45

Lys Leu Ile Ala Asn Trp Asp Tyr Pro Lys Cys Asp Arg Ala Gln Tyr
    50                  55                  60

Ile Lys Ala Asn Ser Lys Phe Ile Gly Ile Thr Glu
65                  70                  75


<210> SEQ ID NO 128
<211> LENGTH: 69
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 128

Ala Arg Asp Leu Ile Cys Ala Gln Glu Asn Gln Lys Leu Ile Ala Asn
1               5                   10                  15

Gln Tyr Ile Lys Ala Asn Ser Lys Phe Ile Gly Ile Thr Glu Ala Arg
            20                  25                  30

Asp Leu Ile Cys Ala Gln Glu Asn Gln Lys Leu Ile Ala Asn Trp Asp
        35                  40                  45

Tyr Pro Lys Cys Asp Arg Ala Gln Tyr Ile Lys Ala Asn Ser Lys Phe
    50                  55                  60

Ile Gly Ile Thr Glu
65


<210> SEQ ID NO 129
<211> LENGTH: 80
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 129

Trp Asp Tyr Pro Lys Cys Asp Arg Ala Thr Glu Val Glu Thr Pro Ile
1               5                   10                  15

Arg Asn Glu His Tyr Glu Glu Cys Ser Cys Tyr Gln Tyr Ile Lys Ala
            20                  25                  30

Asn Ser Lys Phe Ile Gly Ile Thr Glu Ala Arg Asp Leu Ile Cys Ala
        35                  40                  45

Gln Glu Asn Gln Lys Leu Ile Ala Asn Trp Asp Tyr Pro Lys Cys Asp
    50                  55                  60

Arg Ala Gln Tyr Ile Lys Ala Asn Ser Lys Phe Ile Gly Ile Thr Glu
65                  70                  75                  80


<210> SEQ ID NO 130
<211> LENGTH: 39
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 130

His Tyr Glu Glu Cys Ser Cys Tyr Trp Asp Tyr Pro Lys Cys Asp Arg
1               5                   10                  15

Ala Val Glu Thr Pro Ile Arg Asn Glu Gln Tyr Ile Lys Ala Asn Ser
            20                  25                  30

Lys Phe Ile Gly Ile Thr Glu
        35
```

```
<210> SEQ ID NO 131
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 131

Glu Asn Gln Lys Leu Ile Ala Asn Thr Glu Val Glu Thr Pro Ile Arg
1               5                   10                  15

Asn Glu His Tyr Glu Glu Cys Ser Cys Tyr Gln Tyr Ile Lys Ala Asn
            20                  25                  30

Ser Lys Phe Ile Gly Ile Thr Glu
        35                  40
```

VACCINES FOR THE TREATMENT AND PREVENTION OF ZOONOTIC INFECTIONS

REFERENCE TO RELATED APPLICATIONS

This application claims priority to U.S. Provisional Application No. 63/246,580 filed Sep. 21, 2021, and U.S. Provisional Application No. 63/156,645 filed Mar. 4, 2021, both of which are incorporated by reference.

SEQUENCE LISTING

The instant application contains a Sequence Listing which has been submitted electronically in ASCII format and is hereby incorporated by reference in its entirety. Said ASCII copy, created on Mar. 21, 2022, is named 3022_053_US_SL.txt and is 40,609 bytes in size.

BACKGROUND

1 Field of the Invention

The present invention is directed to composite antigens and vaccines composed of a plurality of epitopes of one or more pathogens, and to tools and methods for generating an immune response. In particular, the invention is directed to compositions comprising viral specific peptides and/or nucleic acid sequences as vaccines for the treatment and prevention of viral diseases.

2 Description of the Background

A zoonotic agent is an infectious agent, such as for example, a bacterium, a virus, or a parasite, that has been transmitted from an infected animal to a human. Ebola virus and Human Immunodeficiency Virus (HIV), for example, are believed to have originated in animals and been transmitted to humans. Once transmitted, the now human pathogen may have mutated or become mutated to be a purely human disease and is transmitted to others.

Many strain of influenza that originally infect birds and swine can be transmitted to humans. Pigs are considered as important intermediate hosts for interspecies transmission of the avian influenza virus, because of their susceptibility to infection with both avian and mammalian influenza viruses. The resulting mixing of viruses is believed to produce novel recombinant strains that are more adaptable to humans or other mammals. The human infection typically shows up in workers that are in close proximity to the infected animals or the intermediate host animal. The virus may have mutated to infect a human, and that worker transmits the virus to others in the community or mutates when passed through an intermediate host. Thereafter the infection often spreads worldwide. Approximately two thirds of pathogenic infections in humans today are believed to have originated in animals.

Zoonotic diseases have many different modes of transmission. In direct zoonosis the disease is directly transmitted from infected animals or intermediate animals to humans through the air, through direct contact, or through indirect contact with water sources and feedstuffs. Influenza is believed to spread to humans via breathing infected air, whereas varicella virus is transmitted through direct contact.

The genetics of the host intermediate or human often determine susceptibility to infection or the severity of the disease. Many pathogens require few mutations to establish an infection. Over the past few decades, there has been a significant rise of new zoonotic diseases, which is believed due to the industrialization of animal care.

Three genera of influenza viruses currently comprise the Orthomyxoviridae Family: Influenza virus A, Influenza virus B, and Influenza virus C. Each of these genera contains a single species of influenza virus. The genus Influenza virus A consists of a single species, influenza A virus, which includes all of the influenza virus strains currently circulating among humans, including, for example, but not limited to, H1N1, H1N2, H2N2, H3N1, H3N2, H3N8, H5N1, H5N2, H5N3, H5N8, H5N9, H7N1, H7N2, H7N3, H7N4, H7N7, H9N2, and H10N7 serotypes. In virus classification, influenza viruses are RNA viruses. The genus Influenza virus B consists of a single species, influenza B virus, of which there is currently only one known serotype. Influenza B virus is almost exclusively a human pathogen but is significantly less common and less genetically diverse than influenza A strains. Because of this limited genetic diversity, most humans acquire a certain degree of immunity to influenza B virus at an early age; however, the mutation frequency of the virus is sufficiently high enough to prevent lasting immunity by most humans, but not high enough to permit pandemic infection by influenza B virus across human populations. The genus Influenza virus C also consists of a single species, denoted influenza C virus, of which there is also currently only one known serotype. This serotype is known to infect both primates and porcine, and while infections of influenza C virus are rare, the resulting illness can be severe. Epidemics of influenza C virus are not uncommon in exposed populations, however, due to its rapid transmissibility in humans having close contact.

A fourth family of influenza viruses was identified in 2016—Influenza D, which was first isolated in 2011. Hemagglutinin (HA) and neuraminidase (NA) are the two large glycoproteins on the outside of the viral particles. HA is a lectin that mediates binding of the virus to target cells and entry of the viral genome into the target cell, while NA is involved in the release of progeny virus from infected cells, by cleaving sugars that bind the mature viral particles. Thus, these proteins are targets for antiviral drugs. Furthermore, they are antigens to which antibodies can be raised. Influenza A viruses are classified into subtypes based on antibody responses to HA and NA. These different types of HA and NA form the basis of the H and N distinctions in, for example, H5N1. There are 18 HA and 11 NA subtypes known, but only HA 1, 2 and 3, and NA 1 and 2 are commonly found in humans. Influenza A virus, in particular, has many different serotypes, upwards of 144 possible "HN" serotypes based on variations within these two proteins alone. Only a small number of these combinations are believed to be circulating within susceptible populations at any given time.

Influenza viruses are etiologic agents for a contagious respiratory illness (commonly referred to as the flu) that primarily affects humans and other vertebrates. Influenza is highly infectious and an acute respiratory disease that has plagued the human race since ancient times. Infection is characterized by recurrent annual epidemics and periodic major worldwide pandemics. Influenza virus infection can cause mild to severe illness and can even lead to death. Every year in the United States, 5 to 20 percent of the population, on average, contracts the flu with more than 200,000 hospitalizations from complications and over 36,000 deaths. Because of the high disease-related morbidity and mortality, direct and indirect social economic impacts of influenza are enormous. Four pandemics occurred in the last century, together causing tens of millions of deaths worldwide.

Influenza virus spreads from avian to human hosts through close contact. The genome of avian influenza virus (AIV) consists of eight segments of single-stranded, negative-sense RNA that codes for 11 proteins (PB2, PB1, PB1-F2, PA, HA, NP, NA, M1, M2, NS1, and NS2/NEP). Poultry workers are typically the first human hosts of a new strain of influenza. Therefore, it would be beneficial to treat the poultry before transmission to humans can occur. Annual influenza outbreaks occur as a result of “antigenic drift.” Antigenic drift is caused by mutations within antigenic (i.e., immunity stimulating) portions of viral proteins within viral subtypes circulating in host populations that alter the host’s ability to recognize and defend effectively against the infecting virus, even when the virus has been circulating in the community for several years. The antigenic drift that diminishes existing immunity in a host population generally occurs within so-called immunodominant antigens or regions. Immunodominant antigens are those antigens belonging to a pathogen that are the most-easily and most-quickly recognized by the host immune system and, consequently, account for the vast majority of immune response to the invading pathogen. Typically, immunodominant antigens exist within regions of the pathogen that are most exposed to the environment, i.e., are on the external surfaces or on protruding elements of the pathogen, and so are most readily accessible to the host immune system.

In the case of influenza, the immunodominant HA and NA proteins protrude from the central capsid of the viral particle, and so they tend to interact most strongly with the host’s internal environment and dominate the host immune response. Mutations occurring in the microbial genome that protect the microbe from the host immune system, these mutations are most readily found to affect the immunodominant antigens.

Non-immunodominant antigens are those that are capable of raising a host immune response but account for only a small amount of the total immune response. This is thought to happen because the non-immunodominant antigens are at least partially shielded from the host immune system, as in the case of an antigen that is located in a cleft or fold of the microbial surface or is surrounded by protruding elements of the microbe. In the case of influenza, non-immunodominant antigens occurring near the capsid surface are shielded from the host immune system by the immunodominant HA and NA spikes protruding from the surface. Non-immunodominant antigens tend to show less mutation in response to host immune pressure than do immunodominant antigens.

The CDC and the leading authorities on disease prevention in the world recommend the single best way of preventing a viral respiratory infection in humans is through regular vaccinations. Conventional vaccines typically target the immunodominant proteins, HA and NA antigens for influenza. These vaccines have not been universally protective or 100 percent effective at preventing the disease. Antigenic shift prevents flu vaccines from being universally protective or from maintaining effectiveness over many years. The ineffectiveness of conventional vaccines may also be due, in part, to antigenic drift and the resulting variation within antigenic portions of the HA and NA proteins most commonly recognized by the immune system (i.e., immunodominant antigens). As a result, many humans may find themselves susceptible to the flu virus without an effective method of treatment available since influenza is constantly improving its resistant to current treatments. This scenario is particularly concerning with respect to the H5N1 virus, which is highly virulent but for which there is currently no widely available commercial vaccine to immunize susceptible human populations.

Currently, flu vaccines are reformulated each year due to the yearly emergence of new strains, and generally induce limited immunity. In addition, to achieve a protective immune response, some vaccines are administered with high doses of antigen. This is particularly true for H5N1 vaccines. In addition, influenza vaccines, including H5N1 vaccines, typically present epitopes in the same order as the epitopes are found in nature, generally presenting as whole-viral proteins; consequently, relatively large amounts of protein are required to make an effective vaccine. As a result, each administration includes an increased cost associated with the dose amount, and there is increased difficulty in manufacturing enough doses to vaccinate the general public. Further, the use of larger proteins elevates the risk of undesirable immune responses in the recipient host.

Within an immune response, T cells are important tools of the immune system and a major source of the cascade of cytokines that occurs following an immune response. Two of the principle forms of T cells are identified by the presence of the cell surface molecules CD4 and CD8. T cells that express CD4 are generally referred to as helper T cells. T helper cells include the subsets Th1 and Th2, and the cytokines they produce are known as Th1-type cytokines and Th2-type cytokines, both sets of which are of critical importance in developing an immune response. The Th1-type cytokines produce a pro-inflammatory response stimulating the opsonization of intracellular parasites, basically the humoral immune response. Interferon gamma is one of the principle Th1 cytokines. The Th2-type cytokines include interleukins 4, 5, 10 and 13, which are closely associated with the promotion of a cellular immune response. Against an infection, a balanced Th1 and Th2 response is most desired.

Newcastle disease virus (NDV) is responsible for devastating disease in poultry and has a large economic impact in the industry. Newcastle disease belongs to the genus *Rubulavirus* within the family Paramyxoviridae. However, NDV is believed to be distantly related to other members of the genus *Rubulavirus*. NDV is a contagious viral agent of avian disease affecting both domestic and wild bird species. The negative-strand RNA virus genome of NDV contains six genes encoding six major structural proteins (3'-NP-P-M-F-HN-L-5'). The virus is transmissible to humans, although in most cases the human disease is non-symptomatic. The genome of NDV contains six open reading frames which encode the nucleoprotein (NP), the phosphoprotein (P), the matrix protein (M), the fusion protein (F), the haemagglutinin-neuraminidase (HN) and the large protein (L). At least one additional, non-structural protein (V) and possibly a second one (W), are generated by RNA editing during P gene transcription. The viral particle of Newcastle has been modified to be non-pathogenic and used as a vector for vaccinations. There are many different attenuated strains of NDV and virulence tends to correlate with cleavage of the F protein, although not exclusively. For example, a single U-to-C modification within the U stretch of the P gene attenuated the virus for administration to chicken embryos without substantially reducing replication. Another advantage of live attenuated NDV vaccines is the ability to apply via drinking water or spray, making the cost for administration inexpensive.

Live attenuated ND vaccines are known to stimulate both mucosal and systemic immune responses similar to those of the natural infection. These attenuated NDV strains can be modified with recombinant technology to contain foreign genes. Insertion of the foreign genes can be at different positions in the NDV genome without severely affecting replication efficiency or virus yield. Attenuated strains containing foreign components may be useful for generating a suitable immune response against the foreign component, while maintaining the advantages of NDV.

Currently, the spread of pathogenic influenza virus is controlled in animal populations by vaccination and/or treatment with one or more anti-viral compounds. Vaccines containing inactivated influenza virus or simply influenza antigen are currently in use worldwide. Typically, vaccinations are administered to animals individually, which is impractical and expensive. Accordingly, it would be advantageous have a vaccine that could be administered to large groups of susceptible animals collectively, and also, wherein the vaccine provides protection across a broad range of different strains and/or variations of the target pathogen and/or against multiple pathogens. Such vaccines would be useful both to the industry and to prevent transmission to humans, in other words, short circuiting a pandemic. Such vaccines could be administered against existing as well as new and emerging pathogens.

SUMMARY OF THE INVENTION

The present invention provides new and useful compositions, as well as tools and methods directed to vaccines against one or more pathogens administered to humans, mammals, birds, or other animals to prevent zoonotic infections such as influenza and, in particular, for administration to humans and animals.

One embodiment of the invention is directed to peptides containing one or more viral antigens, epitopes and/or composite antigens or epitopes. Preferably the virus is influenza virus and the antigen and/or epitope is obtained or derived from an HA protein, an NA protein, an M1 protein, an M2 protein, an M2e protein of the influenza virus. Also preferably, the virus is an avian influenza virus. Peptides of the invention may comprise multiple influenza virus epitopes. Peptide may be part of an immunogenic composition which may optionally contain an adjuvant such as, for example, Freund's, a liposome, saponin, lipid A, squalene, and derivatives and combinations thereof. Preferred adjuvants include, for example, AS01 (Adjuvant System 01) which is a liposome-based adjuvant which comprises QS-21 (a saponin fraction extracted from *Quillaja saponaria* Molina), and 3-O-desacyl-4'-monophosphoryl lipid A (MPL; a non-toxic derivative of the lipopolysaccharide from *Salmonella minnesota*) and on occasion a ligand such as a toll-like receptor (e.g., TLR4), AS01b which is a component of the adjuvant Shingrix, ALF (Army Liposome Formulation) which comprises liposomes containing saturated phospholipids, cholesterol, and/or monophosphoryl lipid A (MPLA) as an immunostimulant. ALF has a safety and a strong potency. AS01 is included in the malaria vaccine RTS,S (Mosquirix). ALF modifications and derivatives include, for example, ALF adsorbed to aluminum hydroxide (ALFA), ALF containing QS21 saponin (ALFQ), and ALFQ adsorbed to aluminum hydroxide (ALFQA). A preferred adjuvant formulation comprises Freund's adjuvant, a liposome, saponin, lipid A, squalene, unilamellar liposomes having a liposome bilayer that comprises at least one phosphatidylcholine (PC) and/or phosphatidylglycerol (PG), as phospholipids, which may be dimyristoyl phosphatidylcholine (DMPC), dipalmitoyl phosphatidylcholine (DPPC), distearyl phosphatidylcholine (DSPC), dimyristoyl phosphatidylglycerol (DMPG), dipalmitoyl phosphatidylglycerol (DPPG), and/or distearyl phosphatidylglycerol (DSPG), a cholesterol, a monophosphoryl lipid A (MPLA), and a saponin. Preferably, the immunogenic composition is a vaccine that treats or prevents influenza virus infection in humans, mammals and other animals including but not limited to porcine and avian species.

Another embodiment of the invention comprises a peptide containing one or more avian influenza virus antigens or epitopes and/or composite antigens or epitopes, and one or more T cell stimulating epitopes. The T cell stimulating epitope is obtained or derived from tetanus toxin, tetanus toxin heavy chain proteins, diphtheria toxoid, CRM, recombinant CRM, tetanus toxoid, *Pseudomonas* exoprotein A, *Pseudomonas aeruginosa* toxoid, *Bordetella pertussis* toxoid, *Clostridium perfringens* toxoid, *Escherichia coli* heat-labile toxin B subunit, *Neisseria meningitidis* outer membrane complex, Hemophilus *influenzae* protein D, Flagellin Fli C, Horseshoe crab Haemocyanin, and/or a fragment, derivative, or modification thereof. Preferably the T cell stimulating epitope is at the N-terminus or the C-terminus of the peptide. Peptides of the invention may comprise multiple influenza virus epitopes and/or multiple T cell stimulating epitope. Peptide may be part of an immunogenic composition which may optionally contain an adjuvant such as, for example, Freund's, ALFQ, ALFQA, ALFA, AS01, AS01b, a liposome, saponin, lipid A, squalene, and derivatives and combinations thereof. Preferably, the immunogenic composition is a vaccine that treats or prevents influenza virus infection in animals.

Another embodiment of the invention is directed to viral vectors containing sequences, such as mRNA sequences, that encode one or more antigens or composite antigens disclosed herein and, optionally the T cell stimulating epitope. Preferably the mRNA sequence, upon administration to a host, expresses an epitope that generates an immune response in the host. Preferably the viral vector is an attenuated strain of NDV which encode influenza virus antigens and/or composite antigens of the invention. Preferably nucleic acids encoding the peptide and/or composite peptides as disclosed herein are inserted into the genome of NDV and developed into an attenuated strain of live virus.

Another embodiment of the invention is directed to virus-like-particle (VLP) vectors containing one or more antigens or composite antigens as disclosed herein. Preferably the VLP vector contains antigens and/or composite antigens of the invention.

Another embodiment of the invention is directed to methods to treat and/or prevent an infection by administering an immunogenic composition via a viral vector containing nucleic acids sequences corresponding to peptides and/or composite peptides of the invention, or to VLP vectors containing one or more peptides and/or composite peptides of the invention. Administration comprises dispersing the viral vector or VLP to a collection of animals, such as birds (e.g., chickens, turkeys) or swine. Preferably the viral vector is an attenuated NDV. Preferably the immunogenic composition produces a protection against infection in the animal.

Another embodiment of the invention is directed to methods for generating an immune response in a mammal or an animal comprising administering to a collection of animals the antigens and/or composite antigens as disclosed herein or attenuated NDV strain containing nucleic acid sequence, antigens and/or composite antigens as disclosed herein, to a mammal or an animal. Preferably the immune response generated in the mammal or the animal is protective against a number of different strains, serotypes or species of the one or more pathogens.

Other embodiments and advantages of the invention are set forth in part in the description, which follows, and in part, may be obvious from this description, or may be learned from the practice of the invention.

DESCRIPTION OF THE INVENTION

Vaccinations and vaccines are often the best mechanism for avoiding an infection and preventing the spread of debilitating and dangerous pathogens. With respect to viral infections and many bacterial infections, vaccinations are often the only effective option as treatment options are few and those that are available provide only limited effectiveness. Conventional vaccinations require a priori understanding or general identification of the existing antigenic regions of the pathogen. The pathogen itself is propagated and a suitable vaccine developed from heat-killed or otherwise attenuated microorganisms. Alternatively, an antigen or collection of antigens is identified that will generate a protective immune response upon administration. The need for a vaccine is especially urgent with respect to preventing infection by certain bacteria and viruses. Many bacteria and especially certain viruses mutate constantly or mutate when passing through an intermediate host, often rendering the vaccine developed to the prior or originating bacteria or virus useless against the new strains that emerge. As a consequence, vaccines against infections are reformulated yearly and often administered at fairly high doses. The development and manufacturing costs are high and administering vaccines pose a great many complications and associated risks to patients.

Many viral and also bacterial infections originate in animals including domesticated animals (e.g., bovine, porcine, caprine, avian) and can be transmitted to humans. The human infection typically shows up in workers that are in close proximity to the infected animals or is passed through an intermediate host such as a farm animal. The infectious agent may have mutated to infect a human, and that worker transmits the virus to others in the community or mutates when passed through an intermediate host. Thereafter the infection often spreads worldwide. Approximately two thirds of pathogenic infections in humans today are believed to have originated in animals.

It has been surprisingly discovered that an effective protection against a zoonotic infection can be provided by vaccinating the original animal host. Vaccines can be produced from an antigen or composite antigen as described herein and that vaccine can be administered to animals to prevent later transmission to humans and other hosts. Preferably the vaccine comprises an immunogenic composition or, upon administration (e.g., an mRNA vaccine) expresses one or more immunogenic antigens or epitopes that generates an immune response in the animal and protest the animal from a subsequent exposure.

Antigens and epitopes as disclosed herein contains or are derived from a plurality of antigenic regions (e.g. epitopes) of a pathogen or of different pathogens. Composite antigens of the invention may contain an antigenic region that represents a combination of all or parts of two or more epitopes (e.g., a composite peptide), or a plurality of immunologically responsive regions derived from one or multiple antigenic sources (e.g., epitopes of virus particles, parasites, bacteria, fungi, cells). These immunological regions are amino acid sequences or epitopes that are representative of sequences found at those antigenic regions of a pathogen or other antigen associated with an infection or a disease or, importantly, associated with stimulation of the immune system to provide protection against the pathogen. Administration may be to individuals such as via injection (e.g., intradermal, intravenous, oral, nasal, intraperitoneal). Preferably, immunogenic compositions are administered collectively to animals such as in a water or food supply, or as an aerosol dispensed in a closed or partially closed environment, thereby avoiding the need and expense of providing the vaccine individually.

One embodiment of the invention is directed to antigens of a pathogen, such as viral and/or bacterial antigens. Antigens may be selected regions of the virus or bacterium that are known or believed to generate an effective immune response after administration. The peptide sequence of the antigen may contain a plurality of immunologically responsive regions or epitopes of one or more pathogens, which are artificially arranged, preferably along a single amino acid sequence or peptide. The plurality may contain multiples of the same epitope, although generally not in a naturally occurring order, or multiples of a variety of different epitopes from one or more pathogens. Epitopes may be identical to known immunological regions of a pathogen, or entirely new constructs that have not previously existed and therefore artificially constructed. Preferably, the antigen of the invention induces a protective immunogenic response in the animal or a mammal (e.g., human) and stimulates both mucosal and systemic immune responses similar to those of the natural infection. Preferably that response includes the production of killer T-cell (Tc or CTL) responses, helper T-cell (Tx) responses, macrophages (MP), and specific antibody production in an inoculated subject.

Antigens of the invention may also be obtained or derived from the sequences of a pathogen such as, for example, multiple or combined epitopes of the proteins and/or polypeptides of bacteria, for example, but not limited to *Streptococcus, Pseudomonas, Mycobacterium* such as *M. tuberculosis, Shigella, Campylobacter, Salmonella, Haemophilus influenza, Chlamydophila pneumonia, Corynebacterium diphtheriae, Clostridium tetani, Mycoplasma pneumonia, Staphylococcus aureus, Moraxella catarrhalis, Legionella pneumophila, Bordetella pertussis, Escherichia coli*, such as *E. coli* 0157, and multiple or combined epitomes of conserved regions of any of the foregoing. Exemplary parasites from which sequences may be obtained or derived include but are not limited to *Plasmodium* such as *Plasmodium falciparum* and *Trypanosoma*. Exemplary fungi include, but are not limited to *Aspergillus fumigatus* or *Aspergillus flavus*. Exemplary viruses include, but are not limited to arena viruses, bunyaviruses, coronaviruses, filoviruses, Hepadna viruses, herpes viruses, orthomyxoviruses, parvoviruses, picornaviruses, papillomaviruses, reoviruses, retroviruses, rhabdoviruses, and togaviruses. Preferably, the virus epitopes are obtained or derived from sequences of Influenza viruses (e.g., the paramyxoviruses).

Antigens as disclosed herein include "composite" antigens, which are engineered, artificially created antigens made from two or more epitopes, such that the resulting composite antigen has physical and/or chemical properties that differ from or are additive of the individual epitopes. Preferable the composite antigen, when exposed to the immune system of a mammal or an animal, is capable of simultaneously generating an immunological response to each of the constituent epitope of the composite and preferably to a greater degree (e.g., as measurable from a cellular or humoral response to an identified pathogen) than the individual epitopes. In addition, the composite antigen provides the added function of generating a protective immunological response in a mammal or an animal when used as a vaccine and against each of the constituent epitopes. Preferably, the composite has the additional function of providing protection against not only the pathogens from which the constituents were derived, but related pathogens as well. These related pathogenic organisms may be strains or serotypes of the same species of organism, or different species of the same genus of organism, or different organisms entirely that are only related by a common epitope.

Composite antigens or peptides may contain composite epitopes that represent two or more epitopes with epitope sequences only similar to the epitope sequences from which they were derived. Epitopes are regions obtained or derived from a protein or peptide of a pathogen that elicit a robust immunological response when administered to a mammal or an animal. Preferably, that robust response provides the subject with an immunological protection against developing disease from exposure to the pathogen. A preferred example is a composite epitope, which is one artificially created from a combination of two or more highly conserved, although not identical, amino acid sequences of two or more different, but otherwise related pathogens. The pathogens may be of the same type, but of a different strain, serotype, or species or other relation. The composite epitope contains the conserved region that is in common between the related epitopes, and also contains the variable regions which differ. The sequences of a composite epitope that represents a combination of two conserved, but not identical sequences, may be illustrated as follows:

Sequence of Epitope 1 . . . AAAAABAAAAA . . .

Sequence of Epitope 2 . . . AAAAACAAAAA . . .

Composite Epitope . . . AAAAABCAAAAA . . .

wherein, "A" represents the amino acids in common between the two highly conserved epitopes, "B" and "C" represent the amino acids that differ, respectively, between two epitopes, each of "A", ""B" and "C" can be any amino acid and any number of amino acids. Preferably the conserved region contains about 20 or less amino acids on each side of the variable amino acids, preferably about 15 or less, preferably about 10 or less, preferably about 8 or less, preferably about 6 or less, and more preferably about 4 or less. Preferably the amino acids that vary between two similar, but not identical conserved regions are 5 or less, preferably 4 or less, preferably 3 or less, preferably 2 or less, and more preferably only 1.

A "composite epitope," similar to the composite antigen, is an engineered, artificially created single epitope made from two or more constituent epitopes, such that the resulting composite epitope has physical and/or chemical properties that differ from or are additive of the constituent epitopes. Preferable the composite epitope, when exposed to the immune system of a mammal or an animal, is capable of simultaneously generating an immunological response to each of the constituent epitopes of the composite and preferably to a greater degree than that achieved by either of the constituent epitopes individually. In addition, the composite epitope provides the added function of generating a protective immunological response in a patient when used as a vaccine and against each of the constituent epitopes. Preferably, the composite has the additional function of providing protection against not only the pathogens from which the constituents were derived, but related pathogens as well. These related pathogenic organisms may be strains or serotypes of the same species of organism, or different species of the same genus of organism, or different organisms entirely that are only related by a common epitope.

Composite epitopes of the invention are entirely artificial molecules that do not otherwise exist in nature and to which an immune system has not been otherwise exposed. Preferably, these conserved immunological regions that are combined as a composite epitope represent immunologically responsive regions of proteins and/or polypeptides that are highly conserved between related pathogens. Although a vaccine can be developed from a single composite epitope, in many instances the most effective vaccine may be developed from multiple, different composite epitopes.

Composite antigens of the invention may contain one or more epitopes or composite epitopes, which may include and/or one or more known epitopes to provide an effective vaccine. Although composite antigens may comprise a single composite epitope, a composite antigen would not comprise only a single known epitope. Preferably, the immunological response achieved from a vaccination with a composite antigen, or group of composite antigens, provides protection against infection caused by the original strains from which the sequence of the composite antigen was derived and also provides immunological protection against other strains, serotypes and/or species that share one or more of the general conserved regions represented in the composite antigen. Preferably that response stimulates both mucosal and systemic immune responses in the mammal or the animal, similar to those of the natural infection. Thus, the resulting immune response achieved from a vaccination with a composite antigen is more broadly protective than can be achieved from a conventional single antigen vaccination against multiple strains, serotypes, and species or otherwise related pathogens regardless of antigenic drift that may take place in the evolution of the pathogen. Preferably, vaccines developed from composite antigens of the invention avoid any need for repeated or annual vaccinations, the associated complications and expenses of manufacture, and the elevated risks to the subject. These vaccines are useful to treat individual animals, mammals, and populations or either, thereby preventing infection and mortality and subsequently infections in mammals including pandemics. Such vaccines are also useful to compliment conventional vaccines.

As discussed herein, the composite antigen preferably comprises a single chain of amino acids with a sequence derived from one or more epitopes or a plurality of epitopes, that may be the same or different. Epitope sequences may be repeated consecutively and uninterrupted along a composite sequence or interspersed among other sequences that may be single or a few amino acids as spacers or sequences that encode peptides (collectively spacers), and may be nonimmunogenic or immunogenic and capable of inducing a cellular (T cell) or humoral (B cell) immune response in an animal or a mammal. T-cell stimulating antigens include, for example, tetanus toxin, tetanus toxin heavy chain proteins, diphtheria toxoid (e.g., recombinantly engineered or purified CRM197), tetanus toxoid, *Pseudomonas* exoprotein A, *Pseudomonas aeruginosa* toxoid, *Bordetella pertussis* toxoid, *Clostridium perfringens* toxoid, *Escherichia coli* heat-labile toxin B subunit, *Neisseria meningitidis* outer membrane complex, Hemophilus *influenzae* protein D, Flagellin Fli C, Horseshoe crab Haemocyanin, and fragments, derivatives, and modifications thereof. Peptides sequence from unrelated microbes may be combined into a single composite antigen. For example, viral sequences of selected immunoresponsive peptides may be interspersed with conserved sequences or epitopes selected from other microbes, such as, for example, bacteria such as *S. pneumococcus, P. auriginosa* or *S. aureus*. Preferred viral proteins, from which preferred epitopes may be selected, include, but are not limited to the influenza virus proteins HA, NA, and M2e, and/or coronavirus proteins spike (S), envelope (E), membrane (M), and nucleocapsid (N).

An epitope of the composite antigen may be of any sequence and size, but is preferable composed of natural amino acids or mimetopes and is more than 5 but less than 100 amino acids in length, preferably less than 80, preferably less than 70, preferably less than 60, preferably less than 50, preferably less than 40, preferably less than 30, preferably between 5 and 25 amino acids in length, preferably between 8 and 20 amino acids in length, and more preferably between 5 and 15 amino acids in length. Composite antigens preferably contain any number of composite and/or other epitopes. The most effective number of epitopes of a composite antigen against a particular pathogen, pathogen family, or group of pathogens may be determined by one skilled in the art from the disclosures of this application and using routine testing procedures. Composite antigens may be effective with one epitope, preferably with 2 or more, 3 or more 4 or more, 5 or more or greater. Optionally, composite antigens may include one or more spacers between epitopes which may be sequences of antigenic regions derived from the same or from one or more different pathogens, or sequences that serve as immunological primers or that otherwise provide a boost to the immune system. That boost may be generated from a sequence of amino acids that are known to stimulate the immune system, either directly or as an adjuvant. Preferred adjuvants comprise analgesic adjuvants, inorganic compounds such as alum, aluminum hydroxide, aluminum phosphate, calcium phosphate hydroxide, mineral oil such as paraffin oil, bacterial products such as killed bacteria *Bordetella pertussis, Mycobacterium bovis*, toxoids, nonbacterial organics such as squalene, detergents (Quil A), plant saponins such as *Quillaja*, soybean, *Polygala senega*, cytokines such as IL-1, IL-2, IL-12, Freund's complete adjuvant, Freund's incomplete adjuvant, food-based oil, Adjuvant 65, which is a product based on peanut oil, and derivatives, modifications and combinations thereof. Preferred adjuvants include, for example, AS01 (Adjuvant System 01) which comprises TLR4 ligand, 3-O-desacyl-4'-monophosphoryl lipid A (MPL), and a saponin, QS-21, AS01b which is a component of the adjuvant Shingrix, ALF (Army Liposome Formulation) which comprises liposomes containing saturated phospholipids, cholesterol, and/or monophosphoryl lipid A (MPLA) as an immunostimulant. ALF has a safety and a strong potency. ALF modifications and derivatives include, for example, ALF adsorbed to aluminum hydroxide (ALFA), ALF containing QS21 saponin (ALFQ), and ALFQ adsorbed to aluminum hydroxide (ALFQA). A preferred adjuvant formulation comprises a liposome, saponin, lipid A, squalene, unilamellar liposomes having a liposome bilayer that comprises at least one phosphatidylcholine (PC) and/or phosphatidylglycerol (PG), as phospholipids, which may be dimyristoyl phosphatidylcholine (DMPC), dipalmitoyl phosphatidylcholine (DPPC), distearyl phosphatidylcholine (DSPC), dimyristoyl phosphatidylglycerol (DMPG), dipalmitoyl phosphatidylglycerol (DPPG), and/or distearyl phosphatidylglycerol (DSPG), a cholesterol, a monophosphoryl lipid A (MPLA), and a saponin. Preferably the mole ratio of the cholesterol to the phospholipids is greater than about 50:50 and also that the unilamellar liposomes have a median diameter size in micrometer range as detected by light scattering analysis. Additional preferred adjuvants are disclosed in U.S. Pat. No. 10,434,167, which issued Oct. 8, 2019, the entirety of which is incorporated by reference herein.

In one preferred form, composite antigens useful to generate an immunological response against influenza virus comprise epitopes of HA, M, and/or NA proteins, and/or new epitopes derived from similar conserved regions of different serotypes and strains of influenza virus, and/or from the S protein of coronavirus. Also preferred are composite antigens containing epitopes of proteins of *Mycobacterium tuberculosis* and *Clostridium tetani*, and/or new epitopes derived from similar conserved regions of different serotypes of these bacteria.

Another form of the antigen comprises a contiguous sequence of one or more epitopes, which may comprise composite and/or known epitopes, from one or more pathogens in a sequence that does not exist naturally and must be artificially constructed. Preferably, a contiguous sequence of the invention contains one or more composite epitopes, which is a combination of the sequences of the conserved regions of epitopes that are common to multiple pathogens plus those amino acids that differ between the two conserved regions. For example, where two pathogens contain similar conserved regions that differ by only a single amino acid, the composite sequences would include the conserved region amino acids and each of the amino acids that differ between the two regions as discussed herein.

It is also preferable that a composite antigen of the invention contain a plurality of repeated epitopes and, optionally, epitopes conjugated with linker regions between or surrounding each epitope, and the plurality of epitopes be the same or different. Preferred linkers include amino acid sequences of antigenic regions of the same or of different pathogens, or amino acids sequences that aid in the generation of an immune response. Preferred examples include, but are not limited to, any of the various antigenic regions of bacteria such as, but not limited to tuberculosis and virus such as, but not limited to influenza and coronavirus. It is also preferred that composite antigens contain epitopes that generate a mucosal and/or systemic immune responses similar to that produced from a natural infection.

Another embodiment of the invention is directed to method of immunizing mammals or animals with the immunogenic compositions of the invention. Preferably, the vaccines of the invention are less susceptible to variation of antigenicity due to antigenic shift of pathogens which reduces or eliminates the need for annual or repeated vaccination to maintain protection of the mammal or animal populations against potential outbreaks of infection from, for example, new bacterial strain or viral isolates. In addition, the vaccines of the invention generally and advantageously provide increased safety considerations, both in their manufacture and administration (due in part to a substantially decreased need for repeated administration), a relatively long shelf life in part due to minimized need to reformulate due to strain-specific shift and drift, an ability to target immune responses with high specificity for particular microbial epitopes, and an ability to prepare a single vaccine that is effective against multiple pathogens, each of which may be a different but know strain or species of the same pathogen. The invention encompasses antigenic compositions, methods of making such compositions, and methods for their use in the prevention, treatment, management, and/or prophylaxis of an infection. The compositions disclosed herein, as well as methods employing them, find particular use in the treatment or prevention of viral, bacterial, parasitic and/or fungal pathogenesis and infection using immunogenic compositions and methods superior to conventional treatments presently available in the art.

These methods can prevent or control infections, such as, for example, an outbreak of viral, parasitic, fungal or bacterial infection, preferably but not limited to an influenza virus, coronavirus, and/or a tuberculosis bacterial infection, in a selected population of animals or mammals. The method includes at least the step of providing an immunologically effective amount of one or more of the disclosed immunogenic or vaccine compositions to a susceptible or an at-risk animals of a population, for a time sufficient to prevent, reduce, lessen, alleviate, control, or delay the outbreak of such an infection in the general population. Preferably, the administration is performed into the water or food supply, or as an aerosol into a closed or semi-closed environment where the animals are maintained, even temporarily maintained.

Another embodiment of the invention is directed to an immunogenic composition comprising nucleic acid sequences that encode protective antigens and/or epitopes against a pathogen. The sequences can be incorporated into a viral vector, such as NDV, or another viral vector suitable for the animal population or a mammal. Preferred pathogens include, but are not limited to bacteria, viruses, parasites, fungi and viruses.

In a preferred example, antigens contain a conserved region derived from an influenza virus subtypes (e.g., influenza viruses with varying HA or NA compositions, such as H1N1, H5N1, H3N2, and H2N2). Epitopes of conserved regions on NA or HA may also confer cross-subtype immunity. As an example, conserved epitopes on NA(N1) may confer enhanced immunity to H5N1 and H1N1. With respect to similar or homologous chemical compounds among influenza A subtypes and/or strains within a subtype, preferably these are at least about 80 percent, more preferably at least about 90 percent, more preferably at least about 95 percent identical, more preferably at least about 96 percent identical, more preferably at least about 97 percent identical, more preferably at least about 98 percent identical, more preferably at least about 99 percent identical, and even more preferably 100 percent identical (invariant). Preferably, at least one peptide sequence within the composite antigen is also conserved on homologous proteins (e.g., protein subunits) of at least two viral particles, preferably influenza particles. Proteins of influenza virus include, for example, expressed proteins in the virus structure, such as HA, NA, protein polymerases (PB1, PB2, PA), matrix proteins (M1, M2), and nucleoprotein ("NP"). Preferably, the conserved peptide sequences are conserved on at least two or more of the M1, M2, HA, NA, or one or more polymerase proteins.

In a preferred example, a selected sequence in the M1 and M2 proteins of the H5N1 influenza virus corresponds to the M1 and M2 proteins found in other H5N1 particles, and to the same sequence in the M1 and M2 proteins of the H3N2 influenza virus. In addition, while HA and NA proteins have highly variable regions, conserved sequences from HA and NA are found across many influenza strains and many subtypes (e.g., HA and NA sequences are conserved across H5N1 and H1N1). In a preferred embodiment of the invention, the sequences are derived from a conserved sequence present within variants or strains (viral isolates expressing substantially the same HA and NA proteins, but wherein the HA and NA protein amino acid sequences show some minor drift), of a single influenzavirus subtype and more preferably across at least two influenzavirus subtypes, e.g., subtypes of influenza A virus.

Peptide or polypeptide that includes at least one conserved epitope sequence, which may also comprise one or more repeats of the same or a different epitope sequence, each of which is conserved across a plurality of homologous proteins that is conserved in a population of bacterial or viral strains or serotypes, and a pharmaceutically acceptable carrier. In exemplary composite antigens, at least one epitopic sequence is repeated at least once, preferably at least twice times, more preferably at least three times. In other forms, the at least one epitopic sequence is repeated four or more times. Preferably, the sequences are identical with the sequences in the homologous protein subunits of at least two circulating viral isolates. Compositions may include a pharmaceutically acceptable carrier.

Peptide sequences preferably include sequences derived from genome (i.e., RNA) segment 7 of the influenza virus, while in a more preferred embodiment, the sequences include at least portions of the M1 and M2 proteins. In other preferred embodiments, the sequences include sequences expressed from genome segments encoding the HA or NA proteins. Such sequences are less affected by subtype drift and more broadly protective against infections.

Antigens may include one or more T-cell stimulating epitopes, such as diphtheria toxoid, tetanus toxoid, a polysaccharide, a lipoprotein, or a derivative or any combination thereof (including fragments or variants thereof). Typically, the at least one repeated sequence of the composite antigen is contained within the same molecule as the T-cell stimulating epitopes. In the case of protein-based T-cell stimulating epitopes, the at least one repeated sequence of the composite antigen may be contained within the same polypeptide as the T-cell stimulating epitopes, may be conjugated thereto, or may be associated in other ways. Preferably, one or more T-cell stimulating epitopes are positioned at either the N-Terminus or the C-Terminus (or both) of the antigen.

In additional embodiments, the composite antigens, with or without associated T-cell stimulating epitopes may include one or more polysaccharides or portions thereof. In preferred embodiments, at least one sequence of a composite antigen is conjugated to one or more polysaccharides. In other embodiments, one or more polysaccharides are conjugated to other portions of the composite antigen. Certain embodiments of the present invention are selected from polysaccharide vaccines, protein-polysaccharide conjugate vaccines, or combinations thereof.

Composite antigens of the invention may be synthesizing by in vitro chemical synthesis, solid-phase protein synthesis, and in vitro (cell-free) protein translation, or recombinantly engineered and expressed in bacterial cells, fungi, insect cells, mammalian cells, virus particles, yeast, and the like.

A composite antigen may include one of the following elements: at least one repeated epitope; at least one T-cell epitope; at least one polysaccharide (sugars); at least one structural component; or a combination thereof. The one structural component may include one or more of: at least one linker segment; at least one sugar-binding moiety; at least one nucleotide-binding moiety; at least one protein-binding moiety; at least one enzymatic moiety; or a combination thereof. The invention encompasses methods of preparing an immunogenic composition, preferably a pharmaceutical composition, more preferably a vaccine, wherein a target antigen of the present invention is associated with a pharmaceutically acceptable diluent, excipient, or carrier, and may be used with most any adjuvant, such as, for example, ALFQ, ALFQA, ALFA, AS01, AS01b, and/or combinations, derivatives, and modifications thereof.

Within the context of the present invention, that a relatively small number of conservative or neutral substitutions (e.g., 1 or 2) may be made within the sequence of the composite antigen or epitope sequences disclosed herein, without substantially altering the immunological response to the peptide. In some cases, the substitution of one or more amino acids in a particular peptide may in fact serve to enhance or otherwise improve the ability of the peptide to elicit a systemic response in an animal or a mammal that has been provided with a composition that comprises the modified peptide, or a polynucleotide that encodes the peptide. Suitable substitutions may generally be identified using computer programs and the effect of such substitutions may be confirmed based on the reactivity of the modified peptide with antisera and/or T-cells. Accordingly, within certain preferred embodiments, a peptide for use in the disclosed diagnostic and therapeutic methods may comprise a primary amino acid sequence in which one or more amino acid residues are substituted by one or more replacement amino acids, such that the ability of the modified peptide to react with antigen-specific antisera and/or T-cell lines or clones is not significantly less than that for the unmodified peptide.

As described above, preferred peptide variants are those that contain one or more conservative substitutions. A "conservative substitution" is one in which an amino acid is substituted for another amino acid that has similar properties, such that one skilled in the art of peptide chemistry would expect the secondary structure and hydropathic nature of the peptide to be substantially unchanged. Amino acid substitutions may generally be made on the basis of similarity in polarity, charge, solubility, hydrophobicity, hydrophilicity and/or the amphipathic nature of the residues. For example, negatively charged amino acids include aspartic acid and glutamic acid; positively charged amino acids include lysine and arginine; and amino acids with uncharged polar head groups having similar hydrophilicity values include leucine, isoleucine and valine; glycine and alanine; asparagine and glutamine; and serine, threonine, phenylalanine and tyrosine. Examples of amino acid substitutions that represent a conservative change include: (1) replacement of one or more Ala, Pro, Gly, Glu, Asp, Gln, Asn, Ser, or Thr; residues with one or more residues from the same group; (2) replacement of one or more Cys, Ser, Tyr, or Thr residues with one or more residues from the same group; (3) replacement of one or more Val, Ile, Leu, Met, Ala, or Phe residues with one or more residues from the same group; (4) replacement of one or more Lys, Arg, or His residues with one or more residues from the same group; and (5) replacement of one or more Phe, Tyr, Trp, or His residues with one or more residues from the same group. A variant may also, or alternatively, contain non-conservative changes, for example, by substituting one of the amino acid residues from group (1) with an amino acid residue from group (2), group (3), group (4), or group (5). Variants may also (or alternatively) be modified by, for example, the deletion or addition of amino acids that have minimal influence on the immunogenicity, secondary structure and hydropathic nature of the peptide.

Epitopes may be arranged in any order relative to one another in the composite sequence which may be with or without spacers. The number of spacer amino acids between two or more of the epitopic sequences can be of any practical range, including, for example, from 1 or 2 amino acids to 3, 4, 5, 6, 7, 8, 9, or even 10 or more amino acids between adjacent epitopes.

Another embodiment of the invention is directed to polynucleotides including DNA, RNA (e.g., cRNA, mRNA), and PNA (peptide nucleic acid) constructs that encode the composite sequences of the invention. These polynucleotides may be single-stranded (coding or antisense) or double-stranded, and may be DNA (genomic, cDNA or synthetic) or RNA molecules. Additional coding or non-coding sequences may, but need not, be present within a polynucleotide of the present invention, and a polynucleotide may, but need not, be linked to other molecules and/or support materials. As is appreciated by those of ordinary skill in the art that, as a result of the degeneracy of the genetic code, there are many nucleotide sequences that encode a given primary amino acid sequence. Some of these polynucleotides bear minimal homology to the nucleotide sequence of any native gene. Nonetheless, polynucleotides that vary due to differences in codon usage are specifically contemplated by the present invention. Polynucleotides that encode an immunogenic peptide may generally be used for production of the peptide, in vitro or in vivo. Any polynucleotide may be further modified to increase stability in vivo. Possible modifications include, but are not limited to, the addition of flanking sequences at the 5' and/or 3'-ends; the use of phosphorothioate or 2'-o-methyl rather than phosphodiesterase linkages in the backbone; and/or the inclusion of nontraditional bases such as inosine, queosine and wybutosine, as well as acetyl-methyl-, thio- and other modified forms of adenine, cytidine, guanine, thymine and uridine.

A nucleic acid vaccine of the invention contains the genetic sequence of a composite antigen as cRNA or mRNA, or DNA, plus other necessary sequences that provide for the expression of the composite antigen in cells. By injecting the mammal with the genetically engineered nucleic acid, the composite antigen is produced in or preferably on cells, which the mammal's immune system recognizes and thereby generates a humoral or cellular response to the composite antigen, and therefore the pathogen. Nucleic acid vaccines have a number of advantages over conventional vaccines, including the ability to induce a more general and complete immune response in the mammal. Accordingly, nucleic acid vaccines can be used to protect an animal or a mammal against disease caused from many different pathogenic organisms of viral, bacterial, and parasitic origin as well as certain tumors.

Nucleic acid vaccines typically comprise a viral or bacterial nucleic acid (e.g., cRNA, mRNA, DNA) that encodes an antigen contained in vectors or plasmids that have been genetically modified to transcribe and translate the composite antigenic sequences into specific protein sequences derived from a pathogen. By way of example, the nucleic acid vaccine is administered and the cellular machinery transcribed and/or translates the nucleic acid into the antigens which produce an immune response. The antigens, being non-natural and unrecognized by the mammalian immune system, are processed by cells and the processed proteins, preferably the epitopes, displayed on cell surfaces. Upon recognition of these antigens as foreign, the immune system generates an appropriate immune response that protects from the infection. In addition, nucleic acid vaccines of the invention are preferably codon optimized for expression in the animal (or mammal) of interest. In a preferred embodiment, codon optimization involves selecting a desired codon usage bias (the frequency of occurrence of synonymous codons in coding DNA) for the particular cell type so that the desired peptide sequence is expressed.

Compositions of the invention may contain composite antigens and epitopes, composite sequences, and/or RNA and/or DNA vaccines. Composition may include adjuvants such as, for example, ALFQ, ALFQA, ALFA, AS01, AS01b, and/or combinations, derivatives, and modifications thereof. The formulation of pharmaceutically-acceptable excipients and carrier solutions is well known to those of ordinary skill in the art, as is the development of suitable dosing and treatment regimens for using the particular compositions described herein in a variety of treatment regimens.

The amount of immunogenic composition(s) and the time needed for the administration of such immunogenic composition(s) will be within the purview of the ordinary-skilled artisan having benefit of the present teachings. The administration of a therapeutically-effective, pharmaceutically-effective, and/or prophylactically-effective amount of the disclosed immunogenic compositions may be achieved by a single administration. Alternatively, in some circumstances, it may be desirable to provide multiple, or successive administrations of the immunogenic compositions, either over a relatively short, or even a relatively prolonged period of time, as may be determined by the skilled person overseeing the administration of such compositions.

The immunogenic compositions and vaccines of the present invention preferably contain an adjuvant such as ALFQ and may be given by IM, SQ, Intradermal or intranasal administration or in a manner compatible with the dosage formulation, and in such an amount as will be prophylactically or therapeutically effective and preferably immunogenic. The quantity to be administered depends on the subject to be treated, including, e.g., the capacity of the immune system to mount an immune response, and the degree of protection desired. Suitable dosage ranges may be on the order of several hundred micrograms (μg) of active ingredient per animal or mammal with a preferred range from about 0.1 μg to 2000 μg (even though higher amounts, such as, e.g., in the range of about 1 to about 10 mg are also contemplated), such as in the range from about 0.5 μg to 1000 μg, preferably in the range from about 1 μg to about 500 μg and especially in the range from about 10 μg to about 100 μg. Suitable regimens for initial administration and booster shots are also variable but are typified by an initial administration followed by optional but preferred subsequent inoculations or other periodic administrations.

An effective dose comprises amounts the range of about 1 μg to about 1 mg total protein or target antigen per animal or mammal. In one exemplary embodiment, the vaccine dosage range is about 0.1 μg to about 10 mg per animal or mammal. However, one may prefer to adjust dosage based on the amount of peptide delivered. In either case, these ranges are merely guidelines from which one of ordinary skill in the art may deviate according to conventional dosing techniques. Precise dosages may be determined by assessing the immunogenicity of the conjugate produced in the appropriate host so that an immunologically effective dose is delivered. An immunologically effective dose is one that stimulates the immune system of the animal or mammal to establish an immune response to the immunogenic composition or vaccine. Preferably, a level of immunological memory sufficient to provide long-term protection against disease caused by microbial infection is obtained. The immunogenic compositions or vaccines of the invention may be preferably formulated with an adjuvant. By "long-term" it is preferably meant over a period of time of at least about 6 months, over at least about 1 year, over at least about 2 to 5 or even at least about 2 to about 10 years or longer.

The following examples illustrate embodiments of the invention, but should not be viewed as limiting the scope of the invention.

EXAMPLES

Example 1 Peptides and Sequences

The following is a list of exemplary peptide sequences. These sequences include composite sequences as well as sequences of interest that can be combined to form composite sequences:

Influenza Virus

SEQ ID NO 1
DWSGYSGSFVQHPELTGLD (N1 sequence; H1 N5)

SEQ ID NO 2
ETPIRNE (M2e epitope)

SEQ ID NO 3
FVIREPFISCSHLEC

SEQ ID NO 4
GNFIAP (HA epitope; Pep 1)

SEQ ID NO 5
GNLIAP (HA epitope; Pep 2)

SEQ ID NO 6
GNLFIAP (composite sequence of SEQ ID NOs 4 and 5; Pep 3)

SEQ ID NO 7
GNLIFAP (composite sequence of SEQ ID NOs 4 and 5)

SEQ ID NO 8
HYEECSCY (NA epitope; Pep 10)

SEQ ID NO 9
LLTEVETPIR (highly conserved region M1/M2e)

SEQ ID NO 10
LLTEVETPIRN (highly conserved region M1/M2e)

SEQ ID NO 11
LLTEVETPIRNE (highly conserved region M1/M2e)

-continued

SEQ ID NO 12
DWSGYSGSFVQHPELTGL (N1 sequence; H1 N5)

SEQ ID NO 13
EVETPIRNE (highly conserved region M1/M2e)

SEQ ID NO 14
FLLPEDETPIRNEWGLLTDDETPIRYIKANSKFIGITE

SEQ ID NO 15
GNLFIAPGNLFIAPHYEECSCYHYEECSCYQYIKANSKFIGITEHYEECSCYTPIRNETPIRNE

SEQ ID NO 16
GNLFIAPGNLFIAPQYIKANSKFIGITEGNLFIAP (composite of SEQ ID NO 6, SEQ ID NO 6, SEQ ID NO 61, and SEQ ID NO 6)

SEQ ID NO 17
HYEECSCYDWSGYSGSFVQHPELTGLHYEECSCYQYIKANSKFIGITE

SEQ ID NO 18
ITGFAPFSKDNSIRLSAGGDIWVTREPYVSCDP

SEQ ID NO 19
IWGIHHP (HA epitope)

SEQ ID NO 20
IWGVHHP (HA epitope)

SEQ ID NO 21
IWGVIHHP (composite of SEQ ID NOs. 19 and 20)

SEQ ID NO 22
IWGIVHHP (composite of SEQ ID NOs. 19 and 20)

SEQ ID NO 23
KSCINRCFYVELIRGR (N3 conserved epitope)

SEQ ID NO 24
LLTEVETPIRNESLLTEVETPIRNEWG (M2e epitope)

SEQ ID NO 25
LLTEVETPIRNEW (M2e epitope)

SEQ ID NO 26
LLTEVETPIRNEWG (M2e epitope)

SEQ ID NO 27
LTEVETPIRNE (M2e epitope)

SEQ ID NO 28
LTEVETPIRNEW (M2e epitope)

SEQ ID NO 29
LTEVETPIRNEWG (M2e epitope)

SEQ ID NO 30
MSLLTEVET (M2e epitope)

SEQ ID NO 31
MSLLTEVETP (M2e epitope)

SEQ ID NO 32
MSLLTEVETPI (M2e epitope)

SEQ ID NO 33
MSLLTEVETPIR (M2e epitope)

SEQ ID NO 34
MSLLTEVETPIRN (M2e epitope)

SEQ ID NO 35
MSLLTEVETPIRNE (M2e epitopes)

SEQ ID NO 36
MSLLTEVETPIRNETPIRNE (M2e epitope)

SEQ ID NO 37
MSLLTEVETPIRNEW (M2e epitope)

SEQ ID NO 38
MSLLTEVETPIRNEWG (M2e epitope)

-continued

SEQ ID NO 39
MSLLTEVETPIRNEWGCRCNDSSD (M2e epitope)

SEQ ID NO 40
SLLTEVET (M2e epitope)

SEQ ID NO 41
SLLTEVETPIR (M2e epitope)

SEQ ID NO 42
SLLTEVETPIRNE (M2e epitope)

SEQ ID NO 43
SLLTEVETPIRNEW (M2e epitope)

SEQ ID NO 44
SLLTEVETPIRNEWG (M2e epitope)

SEQ ID NO 45
SLLTEVETPIRNEWGTPIRNE (M2e epitope)

SEQ ID NO 46
SLLTEVETPIRNEWGTPIRNETPIRNE (M2e epitope)

SEQ ID NO 47
SLLTEVETPIRNEWGTPIRNETPIRNETPIRNE (M2e epitopes)

SEQ ID NO 48
SLLTEVETPIRNEWGLLTEVETPIR (M1/M2e conserved region)

SEQ ID NO 49
TEVETPIRNE (M2e epitope)

SEQ ID NO 50
TPIRNE (M2e epitope)

SEQ ID NO 51
VETPIRNE (M2e epitope)

SEQ ID NO 52
VTREPYVSCDPKSCINRCFYVELIRGRVTREPYVSCDPWYIKANSKFIGITE

SEQ ID NO 53
WGIHHP (HA conserved region; Pep 5)

SEQ ID NO 54
WGVHHP (HA conserved region; Pep 4)

SEQ ID NO 55
WGVIHHP (composite of SEQ ID NOs 53 and 54; Pep 6)

SEQ ID NO 56
WGIVHHP (composite of SEQ ID NOs 53 and 54; Pep 7)

SEQ ID NO 57
YIWGIHHP (HA conserved region)

SEQ ID NO 58
YIWGVHHP (HA conserved region)

SEQ ID NO 59
YIWGVIHHP (composite of SEQ ID NOs 57 and 58)

SEQ ID NO 60
YIWGIVHHP (composite of SEQ ID NOs 57 and 58)

SEQ ID NO 61
QYIKANSKFIGITE (T cell epitope)

SEQ ID NO 62
PIRNEWGCRCNDSSD (M2e epitope)

SEQ ID NO 63
GNLFIAPWGVIHHPHYEECSCY (underlined sequences are epitopes HA {composite} (SEQ ID NO 6) and NA (SEQ ID NO 8), respectively, with middle as SEQ ID NO 55, of Influenza A; Pep 11)

-continued

SEQ ID NO 64
CAGAGNFIAP

SEQ ID NO 65
CAGAGNLIAP

SEQ ID NO 66
CAGAGNLFIAP

SEQ ID NO 67
CAGAWGVHHP

SEQ ID NO 68
CAGAWGIHHP

SEQ ID NO 69
CAGAWGVIHHP

SEQ ID NO 70
CAGAWGIVHHP

SEQ ID NO 71
GNLIAPWGVIHHP

SEQ ID NO 72
CAGAGNLIAPWGVIHHP

SEQ ID NO 73
GNLFIAPWGVIHHP

SEQ ID NO 74
CAGAGNLFIAPWGVIHHP

SEQ ID NO 75
HYEECSCY

SEQ ID NO 76
CAGAHYEECSCY

SEQ ID NO 77
CAGAGNLFIAPWGVIHHPHYEECSCY

SEQ ID NO 78
GNLFIAPWGVIHHPGNLFIAPWGVIHHP

SEQ ID NO 79
CAGAGNLFIAPWGVIHHPGNLFIAPWGVIHHP

SEQ ID NO 80
HYEECSCYGNLFIAPWGVIHHP

SEQ ID NO 81
GNLFIAPHYEECSCYWGVIHHP

SEQ ID NO 82
SLLTEVETPIRNEWGLLTEVETPIRQYIKANSKFIGITE

SEQ ID NO 83
GNLFIAPGNLFIAPQYIKANSKFIGITEGNLFIAP

SEQ ID NO 84
HYEECSCYDWSGYSGSFVQHPELTGLHYEECSCYQYIKANSKFIGITE

SEQ ID NO 85
VTREPYVSCDPKSCINRCFYVELIRGRVTREPYVSCDPQYIKANSKFIGITE

SEQ ID NO 86
DWSGYSGSFVQHPELTGL

-continued

SEQ ID NO 87
ITGFAPFSKDNSIRLSAGGDIWVTREPYVSCDP

SEQ ID NO 88
KSCINRCFYVELIRGR

SEQ ID NO 89
GNLFIAPRYAFA

SEQ ID NO 90
CAGAGNLFIAPRYAFA

SEQ ID NO 91
GNLVVPRYAFA

SEQ ID NO 92
CAGAGNLVVPRYAFA

SEQ ID NO 93
GNLIAPRYAFA

SEQ ID NO 94
CAGAGNLIAPRYAFA

SEQ ID NO 95
GNLVVP

SEQ ID NO 96
CAGAGNLVVP

SEQ ID NO 97
FVIREPFISCSHLEC

SEQ ID NO 98
CAGAFVIREPFISCSHLEC

SEQ ID NO 99
GNLFIAPWGVIHHPHYEECSCY (Pep 11)

SEQ ID NO 100
GNLFIAPWGVIHHPHYEECSCY<u>QYIKANSKFIGITE</u>
(Pep 11 with C terminal <u>T cell epitope</u> = Pep 63)

SEQ ID NO 101
<u>QYIKANSKFIGITE</u>GNLFIAPWGVIHHPHYEECSCY
(Pep 11 with N terminal <u>T cell epitope</u> = Pep 64)

SEQ ID NO 102
HVEECSY (N1 and N2)

SEQ ID NO 103
WFIHHP (H5)

SEQ ID NO 104
DLWSYNAELLV (stem peptide)

SEQ ID NO 105
DIWTYNAELLV (stem peptide)

SEQ ID NO 106
HXXXW-matrix peptide common to Flu A and B that constitutes the main functional element of the M2 channel

Coronavirus

SEQ ID NO 107
YPKCDRA = RNA Polymerase region

SEQ ID NO 108
WDYPKCDRA = RNA Polymerase region

SEQ ID NO 109
SLDQINVTFLDLEYEMKKLEESY w/ QYIKANSKFIGITE (SEQ ID NO: 61) = spike protein w/ tetanus toxoid T cell epitope Five coronavirus composite sequences using conserved epitopes.

SEQ ID NO 110
SLDQINVTFLDLEYEMKKLEESY
(coronavirus spike protein conserved epitope (SP))

SEQ ID NO 111
SLDQINVTFLDLEYEMKKLEESYQYIKANSKFIGITE
(tetanus toxoid T cell epitope + SP)

SEQ ID NO 112
WDYPKCDRA
(polymerase conserved epitope (POL))

SEQ ID NO 113
WDYPKCDRAQYIKANSKFIGITE
(POL + tetanus T cell epitope)

SEQ ID NO 114
WDYPKCDRASLDQINVTFLDLEYEMKKLEESYQYIKANSKFIGITE
(Cor POL + SP + Tet)

SEQ ID NO 115
WDYPKCDRATEVETPIRNEHYEECSCYQYIKANSKFIGITE
Cor POL. Flu M2e. Flu NA. Tetanus T cell
(One coronavirus conserved epitope and two Flu conserved epitopes that is a broader pandemic vaccine)

Coronavirus Peptides and Composite Coronavirus/Influenza Peptides

SEQ ID NO 116
SLDQINVTFLDLEYEMKKLEESYQYIKANSKFIGITE
(spike protein epitope with T-cell stimulating epitope)

SEQ ID NO 117
WDYPKCDRA (corona conserved seq-polymerase) neutralizing Ab

SEQ ID NO 118
YPKCDRA (corona conserved seq-polymerase)

SEQ ID NO 119
ARDLICAQ
(highly conserved cor seq-spike attachment same is all three-Cor MERS SARS)

SEQ ID NO 120
KWPWYIWLGFIAGL
(highly conserved cor seq-spike attachment)

SEQ ID NO 121
ENQKLIAN (highly conserved cor seq-spike attachment)

SEQ ID NO 122
ARDLICAQKWPWYIWLGFIAGLENQKLIAN
(combination of conserved seqs w/o T cell epitope)

SEQ ID NO 123
ENQKLIANARDLICAQ
(combination of conserved seqs w/o T cell epitope)

-continued

SEQ ID NO 124
WDYPKCDRAENQKLIANARDLICAQ
(combination of conserved seqs w/o T cell epitope)

SEQ ID NO 125
WDYPKCDRAENQKLIANKWPWYIWLGFIAGL
(combination of conserved seqs w/o T cell epitope)

SEQ ID NO 126
ARDLICAQENQKLIANWDYPKCDRAQYIKANSKFIGITE
(combinations of cor conserved seqs w/ T cell epitope)

SEQ ID NO 127
KWPWYIWLGFIAGLWDYPKCDRAQYIKANSKFIGITEARDLICAQEN
QKLIANWDYPKCDRAQYIKANSKFIGITE
(combination of cor conserved seqs w/ T cell epitope)

SEQ ID NO 128
ARDLICAQENQKLIANQYIKANSKFIGITE ARDLICAQENQKLIAN
WDYPKCDRAQYIKANSKFIGITE
(combination of cor conserved seqs w/ T cell epitope)

SEQ ID NO 129
WDYPKCDRA*TEVETPIRNE*HYEECSCYQYIKANSKFIGITE
ARDLICAQENQKLIANWDYPKCDRAQYIKANSKFIGITE
(combination of cor plus Influenza conserved seqs w/ T cell epitope)

Just bold = Cor
Italicized = m2e
Underlined = Flu
Bold and underlined—T-cell

SEQ ID NO 130
HYEECSCYWDYPKCDRA*VETPIRNE*QYIKANSKFIGITE
(combination of cor plus Influenza conserved seqs w/ T cell epitope)

SEQ ID NO 131
ENQKLIANTEVETPIRNEHYEECSCYQYIKANSKFIGITE
(combination of cor plus Influenza conserved seqs w/ T cell epitope)

Example 2 Induction of Neutralizing Antibodies with Composite Peptides

ICR mice and cotton rats were immunized with 1 μg of conjugated or unconjugated composite influenza peptide vaccine (influenza HA, NA and M2e composite peptides with a T-cell epitope) formulated with ALFQ by intramuscular, or intradermal routes (cotton rats were given both intramuscular, or intradermal injections). Both routes of administration induced serum IgG antibodies that bound to groups 1 and 2 influenza viruses (Flu A California H1N1/pdm09 and Flu A Hong Kong H3N2/4801/2014). In addition, 1 μg of composite influenza vaccine formulated in ALFQ induced neutralizing antibodies against both influenza viruses given by intradermal and intramuscular routes. These data demonstrate that composite influenza peptide vaccines formulated in ALFQ induced a strong immune response at a very low dose without conjugation to a carrier and when administered by different routes of immunization. This provides an advantage in efficiency of manufacturing and decreased cost of production. Low dose intradermal administration also decreases vaccine costs for mass global immunization of humans and for immunizing mammals such as humans or animals such as birds and pigs.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, wherever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

The invention claimed is:

1. An immunogenic composition comprising a viral antigen of a pathogen containing an epitope that, upon administration to a human, a mammal or an animal, generates an immune response to the pathogen, wherein the viral antigen comprises a sequence selected from the group of sequences consisting of SEQ ID NOs. 109-111, 113-116, 120-131 and combinations thereof.

2. The composition of claim 1, which further comprises a sequence of an influenza virus antigen obtained or derived from an hemagglutinin (HA) protein, a neuraminidase (NA) protein, a matrix 1 (M1) protein, a matrix 2 (M2) protein, a matrix 2e (M2e) protein of an influenza virus, and/or a fragment, derivative, or modification thereof.

3. The composition of claim 2, which comprises multiple sequences of influenza virus antigens.

4. The composition of claim 1, further comprising T cell stimulating epitope obtained or derived from tetanus toxin, tetanus toxin heavy chain proteins, diphtheria toxoid, CRM, recombinant CRM, tetanus toxoid, *Pseudomonas* exoprotein A, *Pseudomonas aeruginosa* toxoid, *Bordetella pertussis* toxoid, *Clostridium perfringens* toxoid, *Escherichia coli* heat-labile toxin B subunit, *Neisseria meningitidis* outer membrane complex, Hemophilus *influenzae* protein D, Flagellin Fli C, Horseshoe crab Haemocyanin, and/or a fragment, derivative, or modification thereof.

5. The composition of claim 4, wherein the T cell stimulating epitope is at an N-terminus or a C-terminus of the antigen.

6. The composition of claim 4, which comprises multiple T cell stimulating epitopes.

7. The composition of claim 1, further comprising an adjuvant.

8. The composition of claim 7, wherein the adjuvant comprises Freund's adjuvant, army liposome formulation FQ (ALFQ), army liposome formulation QA (ALFQA), army liposome formulation A (ALFA), adjuvant system 3 (AS01), adjuvant system 01b (AS01b), a liposome adjuvant, saponin, lipid A, squalene, and/or modifications, derivatives and combinations thereof.

9. The composition of claim 1, which is a vaccine that treats or prevents a viral infection.

10. An immunogenic composition comprising a viral antigen of a pathogen containing an epitope that, upon administration to a human, a mammal or an animal, generates an immune response to the pathogen, wherein the viral antigen consists essentially of the sequence of SEQ ID NO. 119.

11. The composition of claim 10, which further comprises a sequence of an influenza virus antigen obtained or derived from an hemagglutinin (HA) protein, a neuraminidase (NA) protein, a matrix 1 (M1) protein, a matrix 2 (M2) protein, a matrix 2e (M2e) protein of an influenza virus, and/or a fragment, derivative, or modification thereof.

12. The composition of claim 11, which comprises multiple sequences of influenza virus antigens.

13. The composition of claim 10, further comprising T cell stimulating epitope obtained or derived from tetanus toxin, tetanus toxin heavy chain proteins, diphtheria toxoid, CRM, recombinant CRM, tetanus toxoid, *Pseudomonas* exoprotein A, *Pseudomonas aeruginosa* toxoid, *Bordetella pertussis* toxoid, *Clostridium perfringens* toxoid, *Escherichia coli* heat-labile toxin B subunit, *Neisseria meningitidis* outer membrane complex, Hemophilus *influenzae* protein D, Flagellin Fli C, Horseshoe crab Haemocyanin, and/or a fragment, derivative, or modification thereof.

14. The composition of claim 13, wherein the T cell stimulating epitope is at an N-terminus or a C-terminus of the antigen.

15. The composition of claim 13, which comprises multiple T cell stimulating epitopes.

16. The composition of claim 10, further comprising an adjuvant.

17. The composition of claim 16, wherein the adjuvant comprises Freund's adjuvant, army liposome formulation FQ (ALFQ), army liposome formulation QA (ALFQA), army liposome formulation A (ALFA), adjuvant system 3 (AS01), adjuvant system 01b (AS01b), a liposome adjuvant, saponin, lipid A, squalene, and/or modifications, derivatives and combinations thereof.

18. The composition of claim 10, which is a vaccine that treats or prevents a viral infection.

19. An immunogenic composition comprising a viral antigen of a pathogen containing an epitope that, upon administration to a human, a mammal or an animal, generates an immune response to the pathogen, wherein the viral antigen consists of the sequence selected from the group of sequences consisting of SEQ ID NOs. 109-111, 113-116, 119-131, and combinations thereof.

* * * * *